United States Patent
Zhang

(10) Patent No.: US 11,805,071 B2
(45) Date of Patent: Oct. 31, 2023

(54) CONGESTION CONTROL PROCESSING METHOD, PACKET FORWARDING APPARATUS, AND PACKET RECEIVING APPARATUS

(71) Applicant: Huawei Technologies Co., Ltd., Shenzhen (CN)

(72) Inventor: Yali Zhang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 226 days.

(21) Appl. No.: 17/331,189

(22) Filed: May 26, 2021

(65) Prior Publication Data
US 2021/0281524 A1 Sep. 9, 2021

Related U.S. Application Data

(63) Continuation of application No. PCT/CN2019/106057, filed on Sep. 17, 2019.

(30) Foreign Application Priority Data

Nov. 27, 2018 (CN) .......................... 201811426088.8

(51) Int. Cl.
*H04L 47/80* (2022.01)
*H04L 45/00* (2022.01)
(Continued)

(52) U.S. Cl.
CPC ............ *H04L 47/801* (2013.01); *H04L 45/38* (2013.01); *H04L 47/623* (2013.01); *H04L 47/762* (2013.01); *H04L 47/781* (2013.01)

(58) Field of Classification Search
CPC ...... H04L 47/801; H04L 45/38; H04L 47/623; H04L 47/762; H04L 47/781; H04L 47/12;
(Continued)

(56) References Cited

U.S. PATENT DOCUMENTS 7,072,295 B1 * 7/2006 Benson ................... H04L 47/10
370/412
7,697,429 B2 * 4/2010 Godlewski .......... H04L 12/2801
370/231
(Continued)

FOREIGN PATENT DOCUMENTS

CN 101945039 A 1/2011
CN 102739507 A 10/2012
(Continued)

OTHER PUBLICATIONS

Munir, A., et al., "On Achieving Low Latency in Data Centers," 2013 IEEE International Conference On Communications (ICC), 2013, 5 pages.
(Continued)

*Primary Examiner* — Kibrom T Hailu
(74) *Attorney, Agent, or Firm* — Conley Rose, P.C.

(57) ABSTRACT

A congestion control processing method uses a two-level scheduling manner of a forwarding device and a destination device, where the network device of a data center network performs coarse-grained bandwidth allocation based on weights of flows destined for different destination devices. The network device allocates each flow a bandwidth that does not cause congestion, and notifies the destination device. The destination device performs fine-grained division, determines a maximum sending rate for each flow, and notifies a packet sending device of the maximum sending rate.

20 Claims, 12 Drawing Sheets

(51) Int. Cl.
*H04L 47/62* (2022.01)
*H04L 47/762* (2022.01)
*H04L 47/78* (2022.01)

(58) Field of Classification Search
CPC ....... H04L 47/125; H04L 47/17; H04L 47/18; H04L 47/225; H04L 47/2433; H04L 47/26; H04L 47/33; H04L 47/70; H04L 47/24

See application file for complete search history.

(56) References Cited

U.S. PATENT DOCUMENTS

| | | | | |
|---|---|---|---|---|
| 8,385,358 | B2* | 2/2013 | Olesinski | H04L 47/623 |
| | | | | 370/412 |
| 2003/0169688 | A1 | 9/2003 | Mott | |
| 2007/0268825 | A1 | 11/2007 | Corwin et al. | |
| 2012/0163385 | A1* | 6/2012 | Lee | H04L 47/193 |
| | | | | 370/392 |
| 2015/0149639 | A1* | 5/2015 | Ismail | H04L 47/72 |
| | | | | 709/226 |
| 2015/0365325 | A1* | 12/2015 | Hwang | H04L 47/12 |
| | | | | 370/230 |
| 2019/0014053 | A1 | 1/2019 | Huang et al. | |
| 2021/0344615 | A1* | 11/2021 | Ishibashi | H04L 47/781 |

FOREIGN PATENT DOCUMENTS

| | | |
|---|---|---|
| CN | 104159256 A | 11/2014 |
| CN | 105721350 A | 6/2016 |
| CN | 105763469 A | 7/2016 |
| CN | 105897612 A | 8/2016 |
| CN | 107196877 A | 9/2017 |
| WO | 2012106315 A2 | 8/2012 |
| WO | 2017157274 A1 | 9/2017 |

OTHER PUBLICATIONS

Rojas-Cessa, R., et al., "Schemes for Fast Transmission of Flows in Data Center Networks," IEEE Communications Surveys and Tutorials, vol. 17, No. 3, 2015, 32 pages.

* cited by examiner

CONGESTION CONTROL PROCESSING METHOD, PACKET FORWARDING APPARATUS, AND PACKET RECEIVING APPARATUS

CROSS-REFERENCE TO RELATED APPLICATIONS

This application is a continuation of International Patent Application No. PCT/CN2019/106057 filed on Sep. 17, 2019, which claims priority to Chinese Patent Application No. 201811426088.8 filed on Nov. 27, 2018, both of which are incorporated herein by reference in their entireties.

TECHNICAL FIELD

This application relates to the field of communications technologies, and in particular, to a congestion control processing method, a packet forwarding apparatus, and a packet receiving apparatus.

BACKGROUND

With the booming of data center networks, increasingly more services are deployed in data center networks. To provide a better quality of service for a user, a requirement on the data center network is becoming increasingly high. For example, a web service or a storage service requires a very low end-to-end delay. One reason for an increase in a data center delay is a dynamic delay caused by congestion. After congestion occurs, a queue length increases or a packet loss phenomenon occurs, which significantly affects a service running speed and service experience.

An existing congestion control mechanism includes passive congestion control and active congestion control. In a passive congestion control mechanism, a network device of a data center network does not perceive another concurrent flow, and convergence to a steady-state speed is relatively slow. However, an active congestion control mechanism can ensure that the last hop is not congested or transient congestion occurs. However, because a plurality of receive ends do not perceive each other, when there is a relatively large quantity of intermediate forwarding devices, a plurality of congestion points may still occur in the network.

Therefore, a congestion control processing mechanism is required to eliminate congestion of a network device and meet a requirement for a low delay.

SUMMARY

This application provides a congestion control processing method, a packet forwarding apparatus, and a packet receiving apparatus.

According to a first aspect, a bandwidth allocation method is provided, and the method includes that a first forwarding device determines a first weight of a service flow that needs to be sent by using a first port and whose destination is a first destination device, where the first forwarding device includes the first port, the first forwarding device allocates, based on the first weight and a total bandwidth of the first port, a first bandwidth to the service flow that needs to be sent by using the first port and whose destination is the first destination device, and the first forwarding device notifies the first destination device of the first bandwidth.

It should be understood that the first port is an egress port of the forwarding device, and the forwarding device sends a received packet flow through at least one egress port. There may be one or more egress ports. For different combination connection manners of a packet sending device, the forwarding device, and the destination device, the first port in this application is also corresponding to different cases.

The first weight may be understood as a bandwidth proportion allocated by the forwarding device to the service flow that needs to be sent by using the first port and whose destination is the first destination device. Based on the bandwidth proportion and the total bandwidth of the first port, the bandwidth allocated to the service flow that needs to be sent by using the first port and whose destination is the first destination device may be determined, that is, a sending rate of the service flow is determined.

Optionally, the forwarding device may receive a plurality of packet flows sent by the packet sending device, and the plurality of packet flows may include a same destination address or may include different destination addresses. For example, the plurality of packet flows are packet flows destined for the first destination device or packet flows destined for a plurality of destination addresses. This is not limited in this application.

In the foregoing technical solution, for different connection forms of a data center network and different ports, a bandwidth allocated by the forwarding device to a service flow, for example, different bandwidths to a service flow of a single destination, a service flow of a plurality of destinations, and service flows from a plurality of forwarding devices or a plurality of packet sending devices may be determined, so as to implement flow-level scheduling of the data center network, maintain a state of each flow, implement network scheduling from a level of the forwarding device, and normalize a weight based on each flow, so as to allocate a proper bandwidth to each flow based on the weight, avoid congestion of an intermediate network, and eliminate possible congestion of the intermediate network, thereby laying a basis for scheduling at a receive end. Various possible port forms are not listed herein one by one. For details, refer to the embodiments of the specification.

With reference to the first aspect, in some implementations of the first aspect, that the first forwarding device determines a first weight of a service flow that needs to be sent by using a first port and whose destination is a first destination device includes the first forwarding device determines a plurality of weights that are in a one-to-one correspondence with a plurality of packet flows included in a first set, where the service flow that needs to be sent by using the first port and whose destination is the first destination device includes the plurality of packet flows included in the first set, and the first forwarding device determines the first weight based on the plurality of weights that are in a one-to-one correspondence with the plurality of packet flows included in the first set, where the first weight is equal to a sum of the plurality of weights that are in a one-to-one correspondence with the plurality of packet flows included in the first set.

When the forwarding device sends a plurality of packet flows to the first destination device, a set including the plurality of packet flows is referred to as the "first set", that is, the plurality of packet flows included in the first set are service flows that need to be sent to the first destination device by using the first port. The forwarding device determines a plurality of weights that are in a one-to-one correspondence with the plurality of packet flows included in the first set, and the forwarding device determines the first weight based on the plurality of weights that are in a one-to-one correspondence with the plurality of packet flows included in the first set, where the first weight is equal to a sum of the plurality of weights that are in a one-to-one correspondence with the plurality of packet flows included in the first set.

For example, all destination addresses of M packet flows are the first destination device, all the M packet flows are sent to the first destination device by using the first port, the M packet flows correspond to M weights, and the first weight is equal to a sum of the M weights that are in a one-to-one correspondence with the M packet flows. When M is 1, that is, when the forwarding device sends one packet flow to the destination device by using the first port, the packet flow corresponds to one weight, that is, the first weight. When M is greater than or equal to 1, that is, when the forwarding device sends the M packet flows to the destination device by using the first port, the M packet flows correspond to M weights, and a sum of the M weights is the first weight.

Optionally, the plurality of packet flows included in the first set may correspond to different priorities. For example, the plurality of packet flows included in the first set may include an elephant flow and a mice flow. A quantity of bits included in the elephant flow is greater than a quantity of bits included in the mice flow, and a weight corresponding to the elephant flow is less than a weight corresponding to the mice flow.

In a possible implementation, the elephant flow is data, and the mice flow is signaling. For example, the data may be a data frame of an audio or a video. Correspondingly, signaling may be a request message initiated by a user, and the request message is used to request to obtain the data frame of the audio or the video from a cloud. It should be understood that a form of a flow, a priority of a flow, and weights of different flows are not limited in this application. For different flows and weights, the forwarding device may allocate the bandwidth by using the method provided in this application.

With reference to the first aspect and the foregoing implementation, in some implementations of the first aspect, that the first forwarding device determines a plurality of weights that are in a one-to-one correspondence with a plurality of packet flows included in a first set includes the first forwarding device receives a plurality of packets, where the plurality of packets respectively belong to the plurality of packet flows, the plurality of packets carry the plurality of weights, and each packet in the plurality of packets carries one weight.

Optionally, the first packet (the initial packet) of each packet flow may carry one piece of weight information. A location and a form of a packet that carries a weight are not limited in this application.

With reference to the first aspect and the foregoing implementations, in some implementations of the first aspect, the method further includes the first forwarding device determines another weight of a service flow that needs to be sent by using the first port and whose destination is another device, where the other device is a destination device other than the first destination device, and that the first forwarding device allocates, based on the first weight and a total bandwidth of the first port, a first bandwidth to the service flow that needs to be sent by using the first port and whose destination is the first destination device includes the first forwarding device allocates the first bandwidth based on the first weight, the other weight, and the total bandwidth of the first port, where the first bandwidth is equal to the total bandwidth of the first port× the first weight/(the first weight+the other weight).

It should be understood that when at least two packet sending devices are connected to one forwarding device, and the forwarding device is connected to at least two destination devices by using the first port, the first port may be a port used by the forwarding device to send a packet flow to the first destination device and a second destination device. In this case, the forwarding device determines a weight of a service flow that needs to be sent by using the first port and whose destination is the first destination device is a first weight, and a weight of a service flow that needs to be sent by using the first port and whose destination is the second destination device is a second weight, and the forwarding device allocates the first bandwidth to the service flow that needs to be sent by using the first port and whose destination is the first destination device.

With reference to the first aspect and the foregoing implementations, in some implementations of the first aspect, the first forwarding device is connected to the first destination device by using a second forwarding device, and that the first forwarding device notifies the first destination device of the first bandwidth includes the first forwarding device notifies the second forwarding device of the first bandwidth, so that the second forwarding device allocates, based on the first bandwidth, a bandwidth to the service flow that needs to be sent by using the first port and whose destination is the first destination device, alternatively, the first forwarding device is connected to the first destination device without using another forwarding device, and that the first forwarding device notifies the first destination device of the first bandwidth includes the first forwarding device notifies the first destination device of the first bandwidth.

In the foregoing solution, for different connection forms of the data center network, for example, if the data center network includes one level of network device, the forwarding device directly notifies the destination device of the determined bandwidth. Alternatively, if the data center network includes at least two levels of network devices, the first forwarding device notifies the second forwarding device of the first bandwidth, so that the second forwarding device allocates, based on the first bandwidth, the bandwidth to the service flow that needs to be sent by using the first port and whose destination is the first destination device, so that the destination device determines a maximum sending rate of at least one packet flow that needs to be sent by using the first port, thereby implementing subsequent congestion control from the destination device side.

With reference to the first aspect and the foregoing implementations, in some implementations of the first aspect, the service flow that is sent by the first forwarding device based on the first bandwidth by using the first port includes a service flow that needs to be sent by a third forwarding device by using a third port and whose destination is the first destination device, and a service flow that needs to be sent by a fourth forwarding device by using a fourth port and whose destination is the first destination device, where the third forwarding device is connected to the first forwarding device by using the third port, a bandwidth allocated by the third forwarding device to the service flow that needs to be sent by using the third port and whose destination is the first destination device is a third bandwidth, the fourth forwarding device is connected to the first forwarding device by using the fourth port, a bandwidth allocated by the fourth forwarding device to the service flow that needs to be sent by using the fourth port and whose destination is the first destination device is a fourth bandwidth, and the first bandwidth includes a first sub-bandwidth and a second sub-bandwidth.

When the total bandwidth of the first port is greater than or equal to a sum of the third bandwidth and the fourth bandwidth, the first sub-bandwidth is equal to the third bandwidth, the second sub-bandwidth is equal to the fourth bandwidth, the first forwarding device sends, to the first destination device by using the first sub-bandwidth, the service flow that needs to be sent by using the third port and whose destination is the first destination device, and the first forwarding device sends, to the first destination device by using the second sub-bandwidth, the service flow that needs to be sent by using the fourth port and whose destination is the first destination device.

With reference to the first aspect and the foregoing implementations, in some implementations of the first aspect, the service flow that is sent by the first forwarding device based on the first bandwidth by using the first port includes a service flow that needs to be sent by a third forwarding device by using a third port and whose destination is the first destination device, and a service flow that needs to be sent by a fourth forwarding device by using a fourth port and whose destination is the first destination device, where the third forwarding device is connected to the first forwarding device by using the third port, a bandwidth allocated by the third forwarding device to the service flow that needs to be sent by using the third port and whose destination is the first destination device is a third bandwidth, the fourth forwarding device is connected to the first forwarding device by using the fourth port, a bandwidth allocated by the fourth forwarding device to the service flow that needs to be sent by using the fourth port and whose destination is the first destination device is a fourth bandwidth, and the first bandwidth includes a first sub-bandwidth and a second sub-bandwidth.

When the total bandwidth of the first port is less than a sum of the third bandwidth and the fourth bandwidth, the first sub-bandwidth is equal to the total bandwidth of the first port× the third bandwidth/(the third bandwidth+the fourth bandwidth), the second sub-bandwidth is equal to the total bandwidth of the first port× the fourth bandwidth/(the third bandwidth+the fourth bandwidth), the first forwarding device sends, to the first destination device by using the first sub-bandwidth, the service flow that needs to be sent by using the third port and whose destination is the first destination device, and the first forwarding device sends, to the first destination device by using the second sub-bandwidth, the service flow that needs to be sent by using the fourth port and whose destination is the first destination device.

The foregoing lists various possible connection forms of the data center network and possible forms of the first port. It should be understood that, in the foregoing cases, a quantity and a form of a device are not limited, for example, a quantity of forwarding devices, and whether the forwarding device is a leaf switch (LS) or a spine. This should not impose a limitation on the method provided in this embodiment of this application.

By using the foregoing various cases of determining the bandwidth, for different connection forms of the data center network and different ports, a bandwidth allocated by the forwarding device to a service flow, for example, different bandwidths to a service flow of a single destination, a service flow of a plurality of destinations, and service flows from a plurality of forwarding devices or a plurality of packet sending devices may be determined, so as to implement flow-level scheduling of the data center network, maintain a state of each flow, implement network scheduling from a level of the forwarding device, and normalize a weight based on each flow, so as to allocate a proper bandwidth to each flow based on the weight, avoid congestion of an intermediate network, and eliminate possible congestion of the intermediate network, thereby laying a basis for scheduling at a receive end.

According to a second aspect, a rate determining method is provided, and the method includes a first destination device receives a first bandwidth notified by a first forwarding device, where the first bandwidth is a bandwidth allocated by the first forwarding device to a service flow that needs to be sent by using a first port and whose destination is the first destination device, and the first forwarding device includes the first port, the first destination device determines, based on the first bandwidth, a maximum sending rate of at least one packet flow in the service flow that needs to be sent by using the first port and whose destination is the first destination device, and the first destination device notifies a packet sending device of the maximum sending rate of the at least one packet flow, and the packet sending device is a device that needs to send the at least one packet flow to the first destination device by using the first forwarding device.

In a possible implementation, when the first destination device receives only one packet flow sent by the forwarding device, that is, the forwarding device sends one packet flow to the destination device by using the first port, the packet flow corresponds to one weight, that is, the forwarding device sends the packet flow at a full rate.

According to the foregoing technical solution, the destination device may receive the first bandwidth sent by the forwarding device, determine, based on the first bandwidth, the maximum sending rate at which the forwarding device sends the service flow by using the first port, and notify the source device of the maximum sending rate, so as to implement congestion control from the destination device side, and prevent network congestion caused by sending a packet flow at an excessively high rate. That is, after coarse-grained congestion control is implemented in the first aspect from a perspective of the forwarding device of a data center network, fine-grained congestion control is performed on the destination device side to control a sending rate of each packet flow destined for each destination device, and allocate a proper bandwidth to each flow. Network congestion of an intermediate network and the last hop is completely eliminated through end-network cooperation, and the intermediate network is easy to implement and is compatible with a plurality of scheduling policies.

With reference to the second aspect, in some implementations of the second aspect, the at least one packet flow includes a plurality of packet flows, and that the first destination device determines, based on the first bandwidth, a maximum sending rate of at least one packet flow in the service flow that needs to be sent by using the first port and whose destination is the first destination device includes the first destination device determines a plurality of weights that are in a one-to-one correspondence with the plurality of packet flows, and the first destination device determines a maximum sending rate of each packet flow in the plurality of packet flows based on the plurality of weights and the first bandwidth, where the maximum sending rate of each packet flow is equal to the first bandwidth×a weight of the packet flow/a sum of the plurality of weights.

For example, all destination addresses of M packet flows are the first destination device, and M is greater than or equal to 1. All the M packet flows are sent to the first destination device by using the first port, the M packet flows correspond to M weights, and the first weight is equal to a sum of the M weights that are in a one-to-one correspondence with the M packet flows. The destination device may determine the maximum sending rate of each packet flow by using the determined weights and the first bandwidth notified by the forwarding device.

With reference to the second aspect and the foregoing implementation, in some implementations of the second aspect, that the first destination device determines a plurality of weights that are in a one-to-one correspondence with the plurality of packet flows includes the first destination device receives a plurality of packets, where the plurality of packets respectively belong to the plurality of packet flows, the plurality of packets carry the plurality of weights, and each packet in the plurality of packets carries one weight.

Optionally, the first packet (the initial packet) of each packet flow may carry one piece of weight information. A location and a form of a packet that carries a weight are not limited in this application.

With reference to the second aspect and the foregoing implementations, in some implementations of the second aspect, the service flow that is sent by the first forwarding device based on the first bandwidth by using the first port includes a service flow that needs to be sent by a third forwarding device by using a third port and whose destination is the first destination device, and a service flow that needs to be sent by a fourth forwarding device by using a fourth port and whose destination is the first destination device, where the third forwarding device is connected to the first forwarding device by using the third port, a bandwidth allocated by the third forwarding device to the service flow that needs to be sent by using the third port and whose destination is the first destination device is a third bandwidth, the fourth forwarding device is connected to the first forwarding device by using the fourth port, a bandwidth allocated by the fourth forwarding device to the service flow that needs to be sent by using the fourth port and whose destination is the first destination device is a fourth bandwidth, and the first bandwidth includes a first sub-bandwidth and a second sub-bandwidth.

When the total bandwidth of the first port is greater than or equal to a sum of the third bandwidth and the fourth bandwidth, the first sub-bandwidth is equal to the third bandwidth, the second sub-bandwidth is equal to the fourth bandwidth, the first destination device receives the service flow that is sent by the first forwarding device by using the first sub-bandwidth, that needs to be sent by using the third port, and whose destination is the first destination device, and the first destination device receives the service flow that is sent by the first forwarding device by using the second sub-bandwidth, that needs to be sent by using the fourth port, and whose destination is the first destination device.

With reference to the second aspect and the foregoing implementations, in some implementations of the second aspect, the service flow that is sent by the first forwarding device based on the first bandwidth by using the first port includes a service flow that needs to be sent by a third forwarding device by using a third port and whose destination is the first destination device, and a service flow that needs to be sent by a fourth forwarding device by using a fourth port and whose destination is the first destination device, where the third forwarding device is connected to the first forwarding device by using the third port, a bandwidth allocated by the third forwarding device to the service flow that needs to be sent by using the third port and whose destination is the first destination device is a third bandwidth, the fourth forwarding device is connected to the first forwarding device by using the fourth port, a bandwidth allocated by the fourth forwarding device to the service flow that needs to be sent by using the fourth port and whose destination is the first destination device is a fourth bandwidth, and the first bandwidth includes a first sub-bandwidth and a second sub-bandwidth.

When the total bandwidth of the first port is less than a sum of the third bandwidth and the fourth bandwidth, the first sub-bandwidth is equal to the total bandwidth of the first port× the third bandwidth/(the third bandwidth+the fourth bandwidth), the second sub-bandwidth is equal to the total bandwidth of the first port× the fourth bandwidth/(the third bandwidth+the fourth bandwidth), the first destination device receives the service flow that is sent by the first forwarding device by using the first sub-bandwidth, that needs to be sent by using the third port, and whose destination is the first destination device, and the first destination device receives the service flow that is sent by the first forwarding device by using the second sub-bandwidth, that needs to be sent by using the fourth port, and whose destination is the first destination device.

By using the foregoing various case examples in which the destination device determines the packet sending rate based on the bandwidth, for different connection forms of the data center network and different ports, a maximum rate at which the port of the forwarding device sends a service flow may be determined, for example, a sending rate of a service flow of a single destination, a sending rate of a service flow of a plurality of destinations, and different sending rates of service flows from a plurality of forwarding devices or a plurality of packet sending devices may be determined, so as to implement flow-level scheduling of a received end device. Further, the destination device determines, based on the bandwidth of the flow and the corresponding weight that are notified by the forwarding device, a maximum sending rate at which the packet sending device sends the flow. The maximum sending rate may ensure that no congestion is caused in the data center network when the packet sending device sends the flow to the forwarding device. Then, the destination device notifies the packet sending device of the maximum sending rate. The packet sending device may send the corresponding flow based on the maximum sending rate (or a rate less than the maximum sending rate) notified by the destination device, so as to avoid congestion in the data center network and eliminate congestion that may occur in the intermediate network.

With reference to the technical solutions in the first aspect and the second aspect, according to the congestion control method described in the foregoing from a perspective of interaction among the packet sending device, the forwarding device, and the destination device, a two-level scheduling manner is used from two levels the forwarding device and the destination device. That is, a network device of the data center network schedules the destination device, performs coarse-grained bandwidth allocation based on weights of flows destined for different destination devices, allocates each flow a bandwidth that does not cause congestion to the central network, and notifies the destination device of the bandwidth. The destination device performs fine-grained division, determines a maximum sending rate for each flow, and notifies the packet sending device of the maximum sending rate. For a case in which a plurality of paths exists, a quantity of flows at each receive end is inconsistent, and a priority distribution degree is inconsistent in the data center network, one normalized weight is implemented. The intermediate network allocates a bandwidth based on a weight of the receive end, and then the receive end determines a sending rate of a transmit end. This method can adapt to capabilities of different devices, so as to maintain a state of each flow, implement network scheduling at the level of the forwarding device, normalize a weight based on each flow, and allocate a proper bandwidth to each flow based on the weight, so that network congestion of the intermediate network and the last hop is completely eliminated through end-network cooperation, and the intermediate network is easy to implement and is compatible with a plurality of scheduling policies.

According to a third aspect, a packet forwarding apparatus is provided, where the apparatus includes a processing unit configured to determine a first weight of a service flow that needs to be sent by using a first port and whose destination is a first destination device, where the first forwarding device includes the first port, and the processing unit is further configured to allocate, based on the first weight and a bandwidth of the first port, a first bandwidth to the service flow that needs to be sent by using the first port and whose destination is the first destination device, and a communications unit configured to notify the first destination device of the first bandwidth.

With reference to the third aspect, in some implementations of the third aspect, the processing unit is further configured to determine a plurality of weights that are in a one-to-one correspondence with a plurality of packet flows included in a first set, where the service flow that needs to be sent by using the first port and whose destination is the first destination device includes the plurality of packet flows included in the first set, and determine the first weight based on the plurality of weights that are in a one-to-one correspondence with the plurality of packet flows included in the first set, where the first weight is equal to a sum of the plurality of weights that are in a one-to-one correspondence with the plurality of packet flows included in the first set.

With reference to the third aspect and the foregoing implementation, in some implementations of the third aspect, before the processing unit determines the plurality of weights that are in a one-to-one correspondence with the plurality of packet flows included in the first set, the communications unit is further configured to receive a plurality of packets, where the plurality of packets respectively belong to the plurality of packet flows, the plurality of packets carry the plurality of weights, and each packet in the plurality of packets carries one weight.

With reference to the third aspect and the foregoing implementations, in some implementations of the third aspect, the processing unit is further configured to determine another weight of a service flow that needs to be sent by using the first port and whose destination is another device, where the other device is a destination device other than the first destination device, and allocate the first bandwidth based on the first weight, the other weight, and the total bandwidth of the first port, where the first bandwidth is equal to the total bandwidth of the first port× the first weight/(the first weight+the other weight).

With reference to the third aspect and the foregoing implementations, in some implementations of the third aspect, the packet forwarding apparatus includes a first packet forwarding apparatus and a second packet forwarding apparatus, the first packet forwarding apparatus is connected to the first destination device by using the second packet forwarding apparatus, and a communications unit of the first packet forwarding apparatus notifies a communications unit of the second packet forwarding apparatus of the first bandwidth, so that a processing unit of the second packet forwarding apparatus allocates, based on the first bandwidth, a bandwidth to the service flow that needs to be sent by using the first port and whose destination is the first destination device, alternatively, the first packet forwarding apparatus is connected to the first destination device without using another forwarding device, and the first packet forwarding apparatus notifies the first destination device of the first bandwidth.

With reference to the third aspect and the foregoing implementations, in some implementations of the third aspect, the packet forwarding apparatus includes a first packet forwarding apparatus, a third packet forwarding apparatus, and a fourth packet forwarding apparatus, the service flow that is sent by the first forwarding device based on the first bandwidth by using the first port includes a service flow that needs to be sent by the third forwarding device by using a third port and whose destination is the first destination device, and a service flow that needs to be sent by the fourth forwarding device by using a fourth port and whose destination is the first destination device, where the third forwarding device is connected to the first forwarding device by using the third port, a bandwidth allocated by the third forwarding device to the service flow that needs to be sent by using the third port and whose destination is the first destination device is a third bandwidth, the fourth forwarding device is connected to the first forwarding device by using the fourth port, a bandwidth allocated by the fourth forwarding device to the service flow that needs to be sent by using the fourth port and whose destination is the first destination device is a fourth bandwidth, and the first bandwidth includes a first sub-bandwidth and a second sub-bandwidth.

When the total bandwidth of the first port is greater than or equal to a sum of the third bandwidth and the fourth bandwidth, a processing unit of the first forwarding device determines that the first sub-bandwidth is equal to the third bandwidth, and the second sub-bandwidth is equal to the fourth bandwidth, and a communications unit of the first forwarding device sends, to the first destination device by using the first sub-bandwidth, the service flow that needs to be sent by using the third port and whose destination is the first destination device, and sends, to the first destination device by using the second sub-bandwidth, the service flow that needs to be sent by using the fourth port and whose destination is the first destination device.

With reference to the third aspect and the foregoing implementations, in some implementations of the third aspect, the packet forwarding apparatus includes a first packet forwarding apparatus, a third packet forwarding apparatus, and a fourth packet forwarding apparatus, the service flow that is sent by the first forwarding device based on the first bandwidth by using the first port includes a service flow that needs to be sent by the third forwarding device by using a third port and whose destination is the first destination device, and a service flow that needs to be sent by the fourth forwarding device by using a fourth port and whose destination is the first destination device, where the third forwarding device is connected to the first forwarding device by using the third port, a bandwidth allocated by the third forwarding device to the service flow that needs to be sent by using the third port and whose destination is the first destination device is a third bandwidth, the fourth forwarding device is connected to the first forwarding device by using the fourth port, a bandwidth allocated by the fourth forwarding device to the service flow that needs to be sent by using the fourth port and whose destination is the first destination device is a fourth bandwidth, and the first bandwidth includes a first sub-bandwidth and a second sub-bandwidth.

When the total bandwidth of the first port is less than a sum of the third bandwidth and the fourth bandwidth, the processing unit of the first forwarding device determines that the first sub-bandwidth is equal to the total bandwidth of the first port× the third bandwidth/(the third bandwidth+the fourth bandwidth), and the second sub-bandwidth is equal to the total bandwidth of the first port× the fourth bandwidth/(the third bandwidth+the fourth bandwidth), and the communications unit of the first forwarding device sends, to the first destination device by using the first sub-bandwidth, the service flow that needs to be sent by using the third port and whose destination is the first destination device, and sends, to the first destination device by using the second sub-bandwidth, the service flow that needs to be sent by using the fourth port and whose destination is the first destination device.

According to a fourth aspect, a packet receiving apparatus is provided, where the apparatus includes a communications unit configured to receive a first bandwidth notified by a first forwarding apparatus, where the first bandwidth is a bandwidth allocated by the first forwarding apparatus to a service flow that needs to be sent by using a first port and whose destination is the packet receiving apparatus, and a processing unit configured to determine, based on the first bandwidth, a maximum sending rate of at least one packet flow in the service flow that needs to be sent by using the first port and whose destination is the packet receiving apparatus, where the communications unit is further configured to notify a packet sending device of the maximum sending rate of the at least one packet flow, and the packet sending device is a device that needs to send the at least one packet flow to the packet receiving apparatus by using the first forwarding apparatus.

With reference to the fourth aspect and the foregoing implementation, in some implementations of the fourth aspect, the at least one packet flow includes a plurality of packet flows, and the processing unit is further configured to determine a plurality of weights that are in a one-to-one correspondence with the plurality of packet flows, and determine a maximum sending rate of each packet flow in the plurality of packet flows based on the plurality of weights and the first bandwidth, where the maximum sending rate of each packet flow is equal to the first bandwidth×a weight of the packet flow/a sum of the plurality of weights.

With reference to the fourth aspect and the foregoing implementation, in some implementations of the fourth aspect, before the processing unit determines the plurality of weights that are in a one-to-one correspondence with the plurality of packet flows, the communications unit is configured to receive a plurality of packets, where the plurality of packets respectively belong to the plurality of packet flows, the plurality of packets carry the plurality of weights, and each packet in the plurality of packets carries one weight.

With reference to the fourth aspect and the foregoing implementations, in some implementations of the fourth aspect, the processing unit determines that the service flow that is sent by the first forwarding device based on the first bandwidth by using the first port includes a service flow that needs to be sent by a third forwarding device by using a third port and whose destination is the first destination device, and a service flow that needs to be sent by a fourth forwarding device by using a fourth port and whose destination is the first destination device, where the third forwarding device is connected to the first forwarding device by using the third port, a bandwidth allocated by the third forwarding device to the service flow that needs to be sent by using the third port and whose destination is the first destination device is a third bandwidth, the fourth forwarding device is connected to the first forwarding device by using the fourth port, a bandwidth allocated by the fourth forwarding device to the service flow that needs to be sent by using the fourth port and whose destination is the first destination device is a fourth bandwidth, and the first bandwidth includes a first sub-bandwidth and a second sub-bandwidth.

When the total bandwidth of the first port is greater than or equal to a sum of the third bandwidth and the fourth bandwidth, the processing unit determines that the first sub-bandwidth is equal to the third bandwidth, and the second sub-bandwidth is equal to the fourth bandwidth, and the communications unit is further configured to receive the service flow that is sent by the first forwarding device by using the first sub-bandwidth, that needs to be sent by using the third port, and whose destination is the first destination device, and receive the service flow that is sent by the first forwarding device by using the second sub-bandwidth, that needs to be sent by using the fourth port, and whose destination is the first destination device.

With reference to the fourth aspect and the foregoing implementations, in some implementations of the fourth aspect, the processing unit determines that the service flow that is sent by the first forwarding device based on the first bandwidth by using the first port includes a service flow that needs to be sent by a third forwarding device by using a third port and whose destination is the first destination device, and a service flow that needs to be sent by a fourth forwarding device by using a fourth port and whose destination is the first destination device, where the third forwarding device is connected to the first forwarding device by using the third port, a bandwidth allocated by the third forwarding device to the service flow that needs to be sent by using the third port and whose destination is the first destination device is a third bandwidth, the fourth forwarding device is connected to the first forwarding device by using the fourth port, a bandwidth allocated by the fourth forwarding device to the service flow that needs to be sent by using the fourth port and whose destination is the first destination device is a fourth bandwidth, and the first bandwidth includes a first sub-bandwidth and a second sub-bandwidth.

When the total bandwidth of the first port is less than a sum of the third bandwidth and the fourth bandwidth, the processing unit determines that the first sub-bandwidth is equal to the total bandwidth of the first port× the third bandwidth/(the third bandwidth+the fourth bandwidth), and the second sub-bandwidth is equal to the total bandwidth of the first port× the fourth bandwidth/(the third bandwidth+the fourth bandwidth), and the communications unit is further configured to receive the service flow that is sent by the first forwarding device by using the first sub-bandwidth, that needs to be sent by using the third port, and whose destination is the first destination device, and receive the service flow that is sent by the first forwarding device by using the second sub-bandwidth, that needs to be sent by using the fourth port, and whose destination is the first destination device.

According to a fifth aspect, a forwarding device is provided, where the forwarding device includes a processor, a memory, and a communications interface, and the processor, the memory, and the communications interface are connected by using a bus. The memory is configured to store program code executed by the processor, and the processor invokes the program code stored in the memory and obtains and forwards a packet by using the communications interface, and when executing an instruction stored in the memory, the processor is configured to complete any congestion control processing method in the first aspect.

According to a sixth aspect, a packet receiving device is provided, where the packet receiving device includes a processor, a memory, and a communications interface, and the processor, the memory, and the communications interface are connected by using a bus. The memory is configured to store program code executed by the processor, and the processor invokes the program code stored in the memory and obtains and forwards a packet by using the communications interface, and when executing an instruction stored in the memory, the processor is configured to complete any congestion control processing method in the first aspect.

According to a seventh aspect, a computer program product is provided, where the computer program product includes computer program code, and when the computer program code runs on a computer, the computer performs any one of the foregoing congestion control processing methods.

According to an eighth aspect, a computer-readable medium is provided, where the computer-readable medium stores program code, and when the computer program code runs on a computer, the computer performs any one of the foregoing congestion control processing methods.

DESCRIPTION OF EMBODIMENTS

The following describes technical solutions of this application with reference to accompanying drawings.

Figure 1:
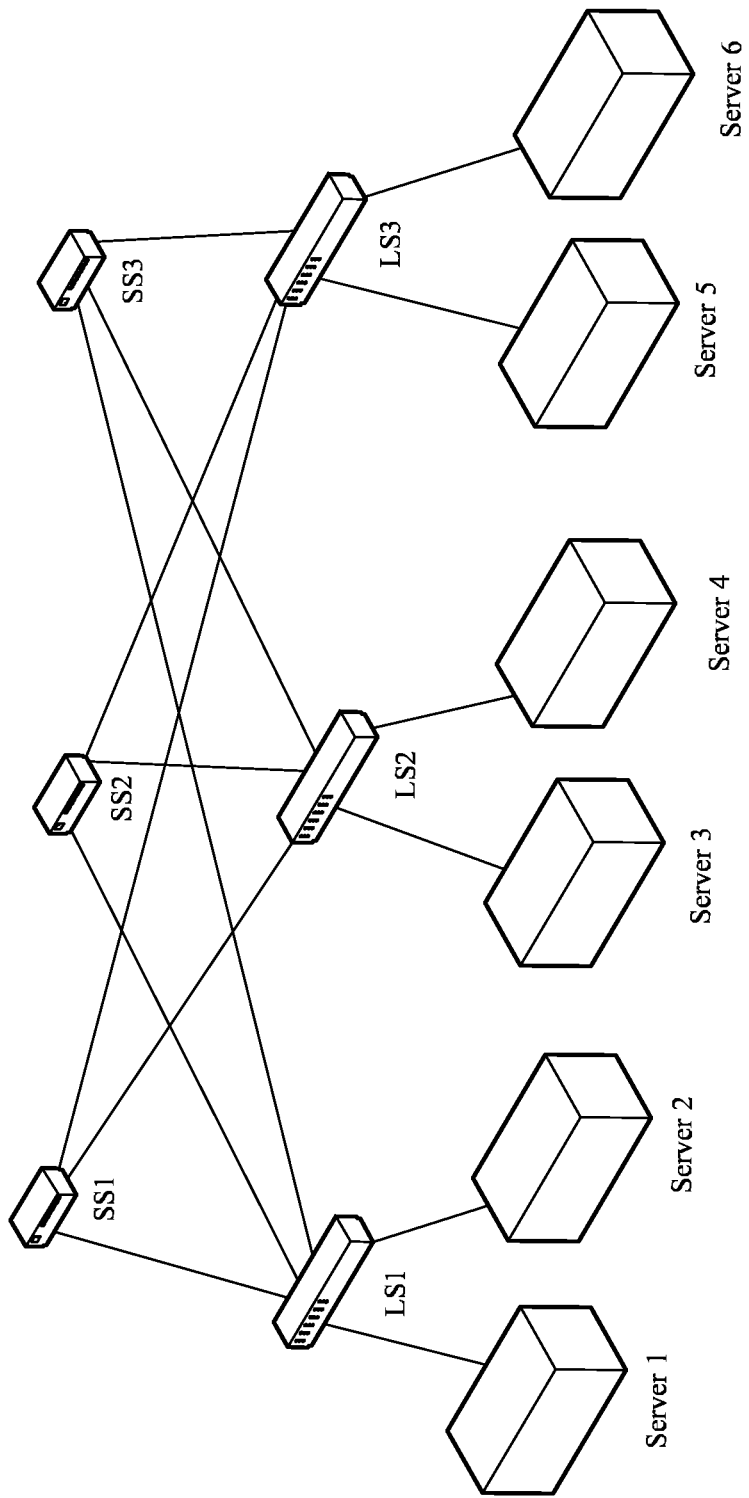
FIG. 1 is a schematic structural diagram of an example data center network according to this application.

FIG. 1 is a schematic structural diagram of an example data center network according to this application. Referring to FIG. 1, a data center network includes a server 1 to a server 6, an LS 1, an LS2, and an LS3, and a spine switch (SS) 1, an SS2, and an SS3. The server 1 and the server 2 are connected to the LS1, the server 3 and the server 4 are connected to the LS2, and the server 5 and the server 6 are connected to the LS3. The LS1 is connected to the SS1, the SS2, and the SS3, the LS2 is connected to the SS1, the SS2, and the SS3, and the LS3 is connected to the SS1, the SS2, and the SS3. The server 1 needs to communicate with another server by using the LS1, and the server 6 needs to communicate with another server by using the LS3. When the server 1 communicates with the server 6, a data flow sent by the server 1 may reach the server 6 through different paths. The different paths include a path 1 (LS1-SS1-LS3), a path 2 (LS1-SS2-LS3), and a path 3 (LS1-SS3-LS3). At a specific time, congestion degrees of the different paths may be different. Compared with a path with a relatively high congestion degree, a path with a relatively low congestion degree is selected to transmit the data flow sent by the server 1 to the server 6, which helps reduce network congestion.

Figure 2:
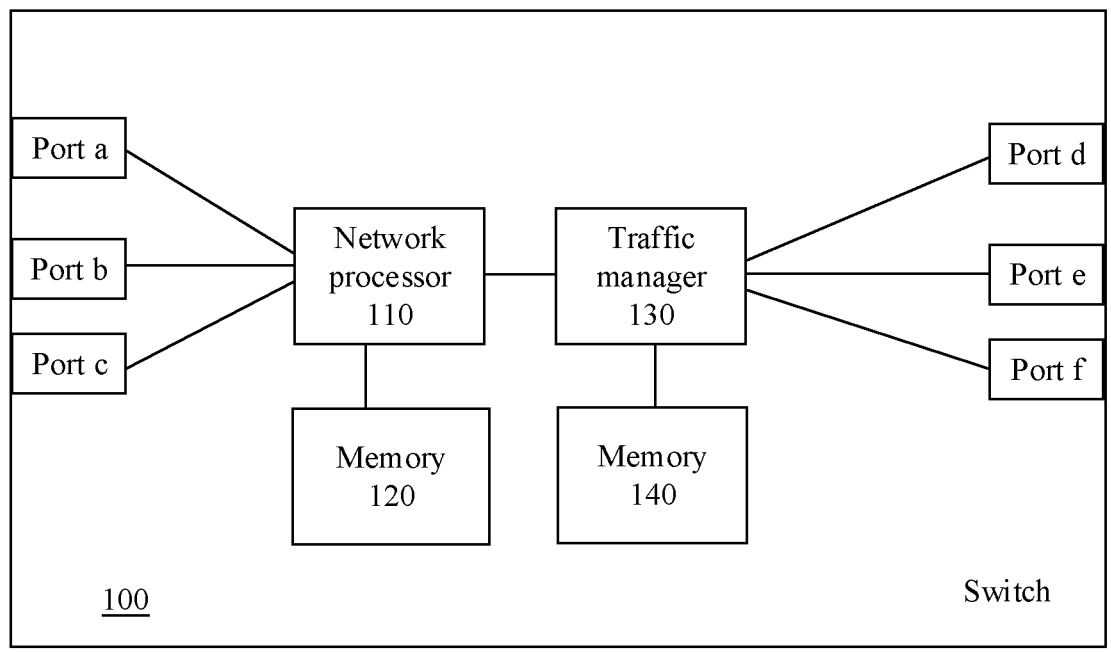
FIG. 2 is a schematic structural diagram of a switch according to this application.

FIG. 2 is a schematic structural diagram of a switch according to this application. The LS in FIG. 1 may be a switch 100, and the SS in FIG. 1 may be the switch 100. For a specific implementation of the LS and the SS in FIG. 1, refer to description of the switch 100 in this application.

Referring to FIG. 2, the switch 100 includes a port a to a port f, a network processor 110, a memory 120, a traffic manager 130, and a memory 140. The port a, the port b, and the port c are coupled to the network processor 110. The port a, the port b, and the port c are transmit ports, and may send a received packet to the network processor 110. The switch 100 may include more or fewer receive ports. The port d, the port e, and the port f are coupled to the traffic manager 130, the network processor 110 is coupled to the memory 120, and the memory 120 may store a computer program and a forwarding table, where the forwarding table may be a hash table.

The network processor 110 may process a packet from a receive port by executing the computer program and/or looking up the forwarding table stored in the memory 120. For example, the network processor 110 may perform a hash operation on a hash key in the packet by executing the computer program, so as to obtain a hash value. For another example, the network processor 110 may determine, by looking up the hash table, an entry that matches the hash value. A transmit port used to forward the packet is determined based on the entry that matches the hash value, where the transmit port may be the port d, the port e, or the port f. The network processor 110 is coupled to the traffic manager 130, and the traffic manager 130 is coupled to the memory 140. For example, after determining the transmit port used to forward the packet, the network processor 110 may send the packet to the traffic manager 130. The traffic manager 130 may also be referred to as a scheduler. The traffic manager 130 may maintain three sending cache queues that are in a one-to-one correspondence with the port d, the port e, and the port f. After receiving the packet from the network processor 110, the traffic manager 130 may enqueue, based on the transmit port used to forward the packet, the packet to a sending cache queue corresponding to the transmit port used to forward the packet. The traffic manager 130 may schedule the packet located in the sending cache queue, so as to send the packet by using the transmit port. Further, the traffic manager 130 may maintain three packet descriptor queues that are in a one-to-one correspondence with the three sending cache queues. The packet descriptor queue includes a plurality of packet descriptors, and each packet descriptor includes an address of a packet stored in the sending cache queue. When the traffic manager 130 needs to enqueue a packet to a sending cache queue, the traffic manager 130 may add a storage address of the packet to a packet descriptor queue. The traffic manager 130 may perform a write operation on the memory 140, so as to enqueue the packet to the sending cache queue. When the traffic manager 130 needs to dequeue a packet from a sending cache queue, the traffic manager 130 may delete a storage address of the packet from a packet descriptor queue. The traffic manager 130 may perform a read operation on the memory 140, so as to dequeue the packet from the sending cache queue. After the packet is dequeued, the packet is sent through the transmit port. The network processor 110 may be configured to implement a processing unit in this application, and the port may be configured to implement a receiving unit and a sending unit in this application.

Figure 3:
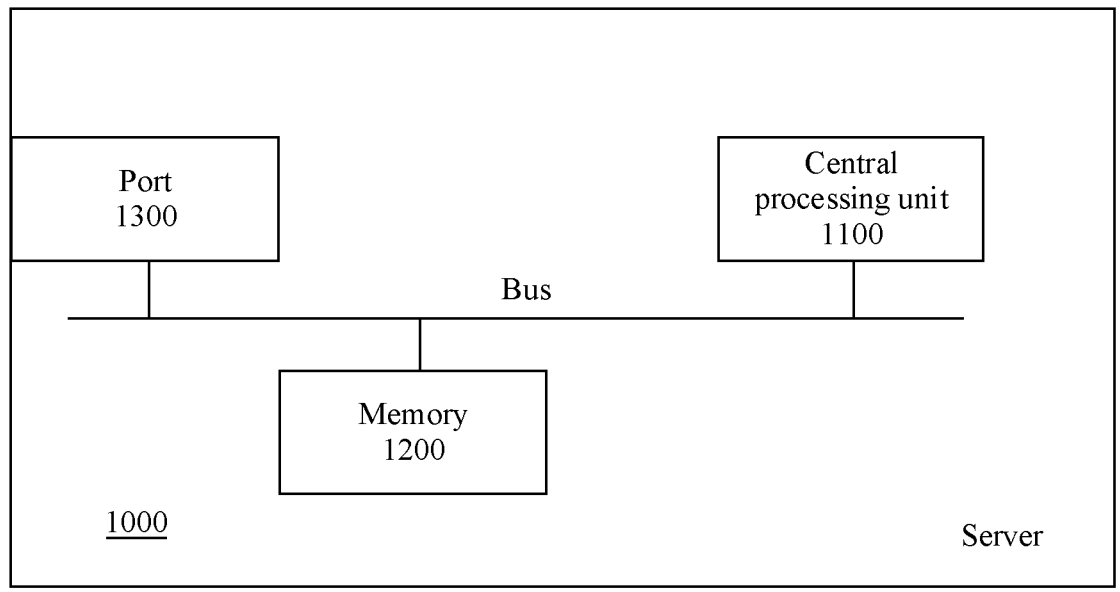
FIG. 3 is a schematic structural diagram of a server according to this application.

FIG. 3 is a schematic structural diagram of a server according to this application. The server in FIG. 1 may be a server 1000. For a specific implementation of the server in FIG. 1, refer to description of the server 1000 in this application.

Referring to FIG. 3, the server 1000 includes a central processing unit 1100, a memory 1200, a port 1300, and a bus, and the processing unit 1100, the memory 1200, and the port 1300 are coupled by using the bus. The memory 1200 stores software, where the software includes an operating system and a plurality of application programs. The central processing unit 1100 runs the operating system and the plurality of application programs by accessing the memory 1200, and the operating system may be WINDOWS or LINUX. The central processing unit 1100 runs the plurality of application programs based on the operating system. The port 1300 may be configured to receive a packet and send a packet. For example, after the port 1300 receives a packet from the switch 100, the memory 1200 may store the packet, and the central processing unit 1100 may process the packet based on the application program. In addition, the central processing unit 1100 may generate a packet based on the application program, and send the packet to the switch 100 through the port 1300.

The central processing unit 1100 may be configured to implement a processing unit in this application, and the port may be configured to implement a receiving unit and a sending unit in this application. In addition, the central processing unit 1100 may be replaced with another processor, where the other processor may be a digital signal processor (DSP), an application-specific integrated circuit (ASIC), a field-programmable gate array (FPGA) or another programmable logic device, a transistor logic device, a hardware component, or any combination thereof, and may implement or execute various example logic blocks, modules, and circuits described with reference to the content disclosed in the embodiments of the present disclosure. The processor may also be a combination of implementing computing functions, for example, a combination including one or more microprocessors, or a combination of a DSP and a microprocessor.

In the description of this application, the server serves as a packet sending device and a packet receiving device, and an LS and an SS serve as forwarding devices or forwarding nodes. A packet forwarding process among the packet sending device, the forwarding device, and the packet receiving device is used as an example for detailed description and description of a load balancing processing method in this application. For example, the server 1 serves as a packet sending device, the LS1-LS3 or the SS1-SS3 serve as forwarding devices, and the server 6 serves as a packet receiving device. It should be understood that a quantity or a form of the packet sending device, the forwarding device, and the packet receiving device that are included in the data center network are not limited in this application.

For ease of understanding by a person skilled in the art, the following first explains some terms in this application.

1. Transmission Control Protocol (TCP):

TCP is a connection-oriented, reliable, byte stream-based transport layer communications protocol and is defined in protocol Request for Comments (RFC) 793 (RFC793) of the Internet Engineering Task Force (IETF). In a simplified Open Systems Interconnection (OSI) model, TCP implements a function specified to layer 4 transport layer. In the Internet Protocol (IP) suite, a TCP layer is an intermediate layer located above an IP layer and below an application layer. The application layer sends, to the TCP layer, a data flow that is used for inter-network transmission and is represented by 8 bytes, and then the TCP partitions the data flow into a packet segment of a proper length. A partition of the packet segment is usually limited by a maximum transmission unit (MTU) of a data link layer of a network connected to a computer. The TCP then sends a result packet to the IP layer, which transmits the packet to a TCP layer of a receiving device through the network. To ensure that no packet loss occurs, TCP gives a sequence number to each packet, and the sequence numbers also ensure that packets transmitted to the packet receiving device are received in sequence. Then, the packet receiving device returns a corresponding acknowledgement (ACK) for a successfully received packet. If a transmit end device does not receive an ACK within a proper round-trip time (RTT), it is assumed that a corresponding data packet is lost, and retransmission is performed. TCP uses a check sum function to check whether there is an error in data. A checksum needs to be calculated during sending and receiving.

In addition, TCP defines concepts a window, a TCP sending window, an ACK, a segment, a TCP sender, and a TCP receiver. For the TCP window, the ACK, the segment, the TCP sender, and the TCP receiver, refer to RFC793, RFC813, RFC879, RFC1180, RFC5681, and RFC5690 that are released by the IETF. Details are not described in this application.

2. Congestion Control Mechanism:

A congestion control mechanism includes passive congestion control and active congestion control. An existing congestion control mechanism at a transport layer is usually passive congestion control, that is, a packet sending device adjusts a packet sending rate of the packet sending device based on a congestion degree of a data center network, typically, for example, TCP/DC TCP, and an existing remote direct memory access (RDMA) over converged Ethernet (RoCE). However, there are some obvious problems in this passive congestion control. For example, after congestion occurs in a data center network, adjustment may cause a control granularity of a high-speed network to become poor, other concurrent flows are not perceived, and convergence to a steady-state speed is relatively slow. Therefore, active congestion control is currently performed on an intermediate network device or directly on a receive end device. That is, a sending data amount, a sending opportunity, and the like of a transmit end are explicitly controlled based on concurrent traffic. Active congestion control has become a new congestion control mechanism manner.

Figure 4:
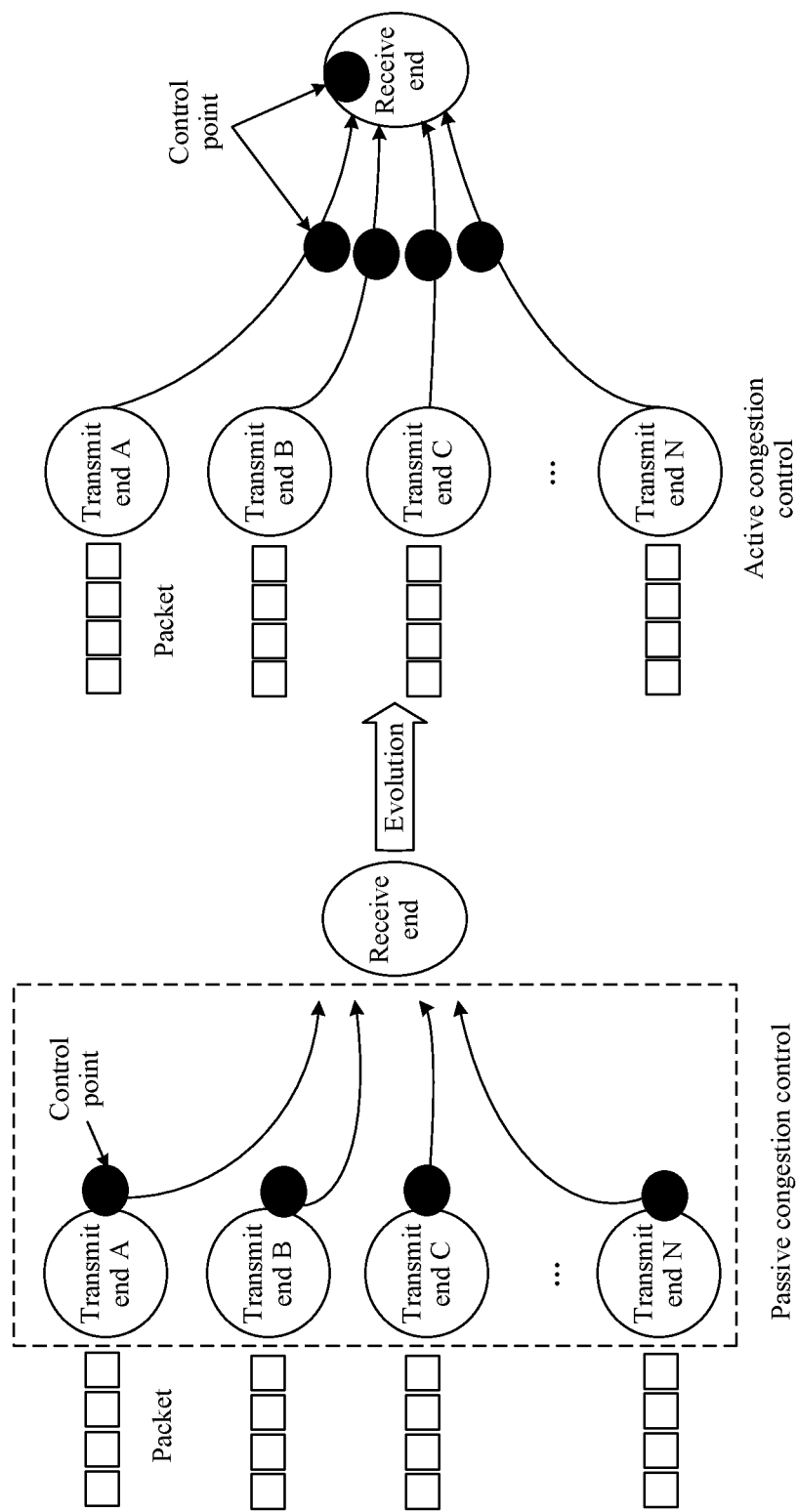
FIG. 4 is a schematic diagram of example packet forwarding according to this application.

FIG. 4 is a schematic diagram of evolution from passive congestion control to active congestion control. As shown in FIG. 4, packet sending between a transmit end device and a receive end device is used as an example. The left figure of FIG. 4 is a schematic diagram of passive congestion control, and congestion control occurs in a protocol stack of the transmit end device, for example, a protocol stack of a server side. When the transmit end device sends some packets, after a packet loss or marking occurs in a packet sending process, a control point automatically runs a rate limiting algorithm to limit a packet sending rate of a network. If no packet loss or marking occurs, the control point runs a rate increasing algorithm to increase the packet sending rate of the network. In this passive congestion control mechanism, a network device of a data center is a black box. As shown in a dashed line box in the left figure of FIG. 4, in the black box of congestion control, a packet sending device cannot learn how many flows to send. In addition, the control point may explore a proper sending rate based on network feedback information, for example, the packet sending device needs to continuously perform detection and adjustment. As a result, a jitter is relatively large, and convergence to a steady state is relatively slow. After evolution to an active congestion control mechanism shown in the right figure of FIG. 4, the network device in the data center becomes transparent, and a congestion point such as a network side or a receive end perceives concurrent traffic. That is, the control point can accurately know how many flows need to be sent, and can implement allocation of a sending rate or a sending bandwidth without needing to measure a network status, so as to control a rate. When a flow enters the network, a steady rate is formed.

Figure 5:
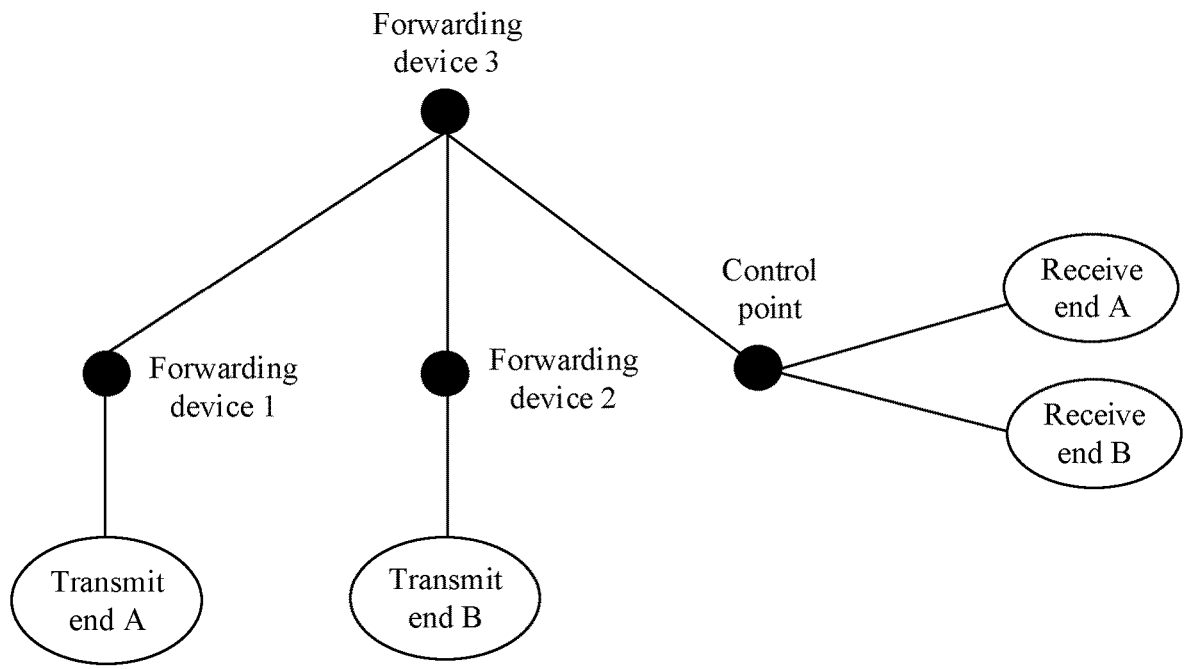
FIG. 5 is a schematic diagram of a packet forwarding path from a transmit end to a receive end according to this application.

However, current active congestion control basically uses a mode in which a receive end controls a transmit end, that is, the receive end allocates a credit based on a concurrent flow request, so as to ensure that a packet from a packet sending device can be controlled to arrive, thereby avoiding congestion. FIG. 5 is a schematic diagram of a packet forwarding path from a transmit end to a receive end. A transmit end A sends a packet to a receive end A by using a forwarding device 1 and a forwarding device 3, and a transmit end B sends a packet to a receive end B by using a forwarding device 2 and the forwarding device 3. In addition, the receive end knows how many flows it needs to receive. Therefore, the receive end A may send credit signaling to the transmit end A, and the receive end B sends credit signaling to the transmit end B, so as to separately indicate flows that the transmit ends need to send. Active congestion control is mainly implemented on a server side. The server side decides its own sending bandwidth to ensure that the last hop is not congested, but cannot ensure that an upper-layer forwarding device is not congested. For example, the receive end A and the receive end B have no other traffic. Therefore, the receive end A may want to request the transmit end A to send a packet at a full rate, and the receive end B may want to request the transmit end B to send a packet at a full rate, thereby causing congestion of the forwarding device 3. Currently, a load balancing mechanism is required to avoid congestion of an intermediate forwarding device. However, the load balancing mechanism is not mature. Therefore, an Explicit Congestion Notification (ECN) is mainly used to mark whether a network is congested, and the ECN is used to detect a network congestion situation. In this way, a marking method is also inaccurate. In addition, this active congestion control mechanism can ensure that the last hop is not congested or transient congestion occurs. However, because a plurality of receive ends do not perceive each other, when there is a relatively large quantity of intermediate forwarding devices, a plurality of congestion points may still occur in the network.

Figure 6:
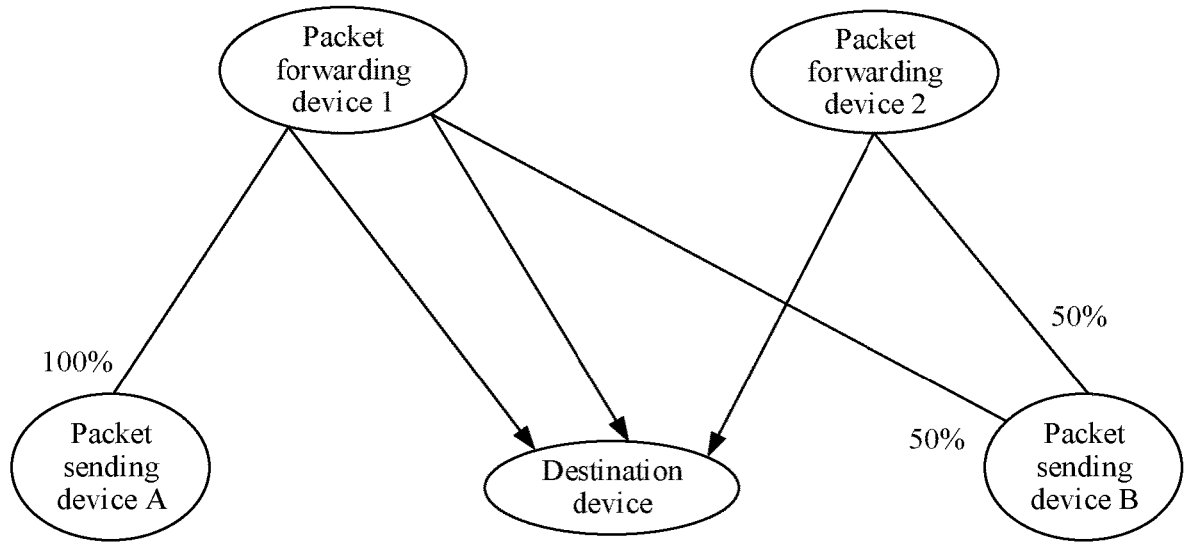
FIG. 6 is a schematic diagram of packet forwarding in an example asymmetric topology network.

For the foregoing problem, an existing solving idea is that a packet-by-packet load balancing manner is used to ensure that there is no congestion in an intermediate network. Because generally a data center is not converged, that is, a path that is not congested can always be found between a determined source end and a determined destination end. In this manner, in a strictly symmetric clos topology architecture, it can be ensured that the intermediate network is not congested, and congestion occurs only on the last hop. Active congestion control on the receive end can completely eliminate network congestion. However, asymmetric cases often occur in a topology of a data center, such as a link fault and a network upgrade. In the packet-by-packet load balancing manner, congestion degrees may be different, and therefore a case of disorder may occur in an asymmetric network. Therefore, it is difficult to apply packet-by-packet load balancing to the data center. For example, in a schematic diagram of packet forwarding in an example asymmetric topology network in FIG. 6, all traffic of a packet sending device A arrives at a destination device by using a forwarding device 1, and traffic of a packet sending device B may arrive at the destination device by using the forwarding device 1 and a forwarding device 2. Therefore, the forwarding device 1 is prone to congestion and packet disorder.

Figure 7:
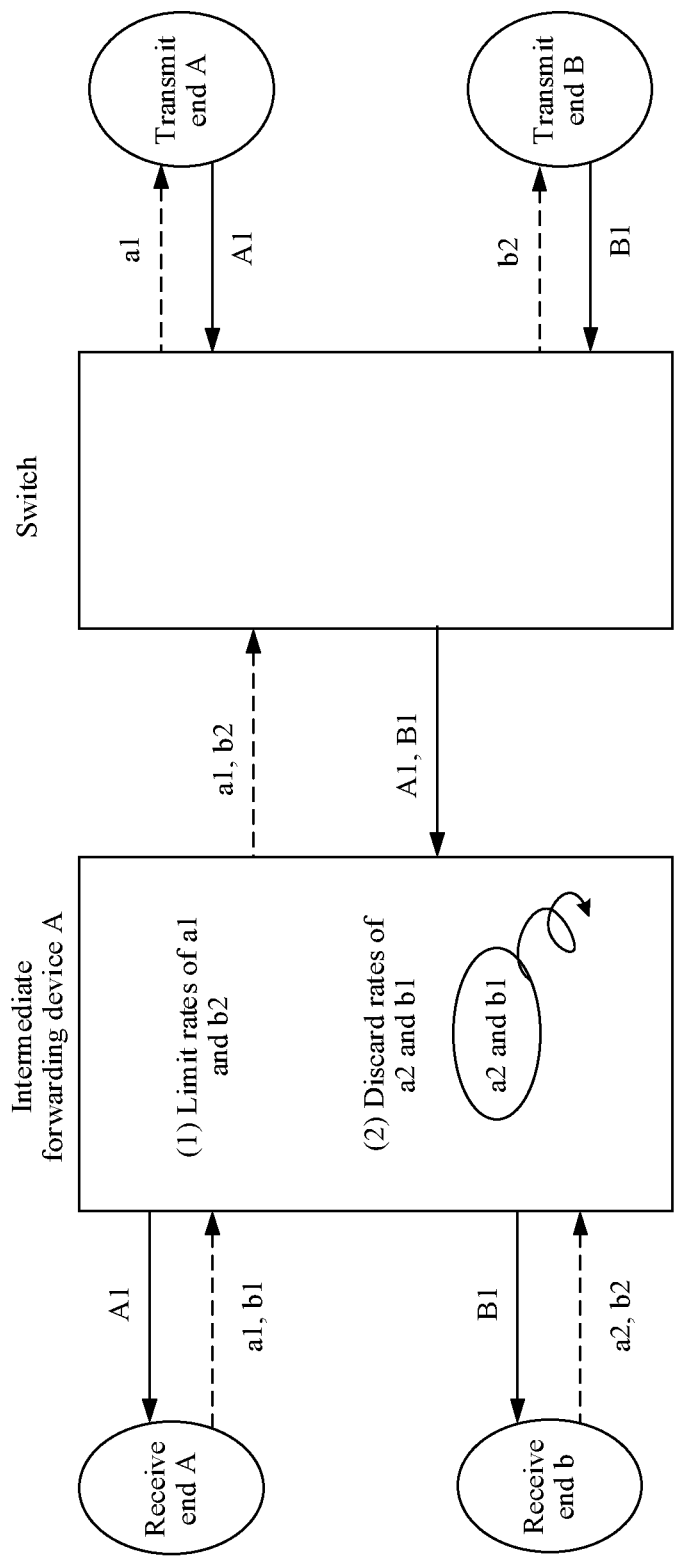
FIG. 7 is a schematic diagram of a manner in which an intermediate network discards credit signaling for rate limiting.

In another solution, to avoid congestion of an intermediate network, a manner in which the intermediate network limits credit signaling sending may be used to limit traffic sending of a packet sending device. FIG. 7 is a schematic diagram of a manner in which an intermediate network discards credit signaling for rate limiting. As shown in FIG. 7, a receive end A and a receive end B separately send credit signaling at a rate of 10 gigabits per second (Gbps) (e.g., it is assumed that a port rate is 10 Gbps). In FIG. 7, credit signaling sent by the receive end A to a transmit end A and a transmit end B is respectively represented as a1 and a2, and credit signaling sent by the receive end B to the transmit end A and the transmit end B is respectively represented as b1 and b2. To avoid congestion of an intermediate network, an intermediate forwarding device A may perform the following operations: (1) modifying the credit signaling to a rate of 5 Gbps, so as to reduce a sending rate of the transmit end. For example, rates of a1 and b2 are limited in FIG. 7, that is, a sending rate of the transmit end A and a sending rate of the transmit end B are reduced. (2) discarding a partial rate. For example, rates of a2 and b1 are discarded in FIG. 7, so as to ensure that congestion does not occur in a downlink of a spine.

Although congestion can be avoided in the foregoing manner, it is required that a sent packet and a credit packet have a same path. In a scenario in which there are many paths and various load balancing mechanisms in a data center, it is difficult to ensure a congestion control effect. In addition, when credit signaling is received, it is necessary to determine whether congestion will occur in a reverse data packet. This requires very complicated processing.

Accordingly, depending on the active congestion control mechanism scheduled by the receive end, congestion can be avoided only on the last hop, and a plurality of receive ends do not perceive each other, which may cause congestion of the intermediate network. The manner in which the intermediate network limits credit signaling sending so as to limit traffic sending of the packet sending device has a complex processing process, and it is difficult to ensure a congestion effect. This application provides a congestion control method, which can completely eliminate congestion of a network device by using a two-level scheduling manner in which a central network and a server cooperate with each other, and meet a requirement for a low delay. The following describes in detail the congestion control method provided in the embodiments of this application with reference to FIG. 8 to FIG. 13.

It should be understood that the congestion control method provided in this application may be applied to the network device in the network architecture shown in FIG. 1. In the embodiments of this application, an interaction process among a packet sending device, a forwarding device, and a destination device is used as an example for detailed description. The packet sending device and the forwarding device may be network devices in the network architecture shown in FIG. 1, for example, servers or switches. By way of example and not limitation, a method 800 may alternatively be performed by a chip applied to the network device. Various application scenarios are described in detail below.

Figure 8:
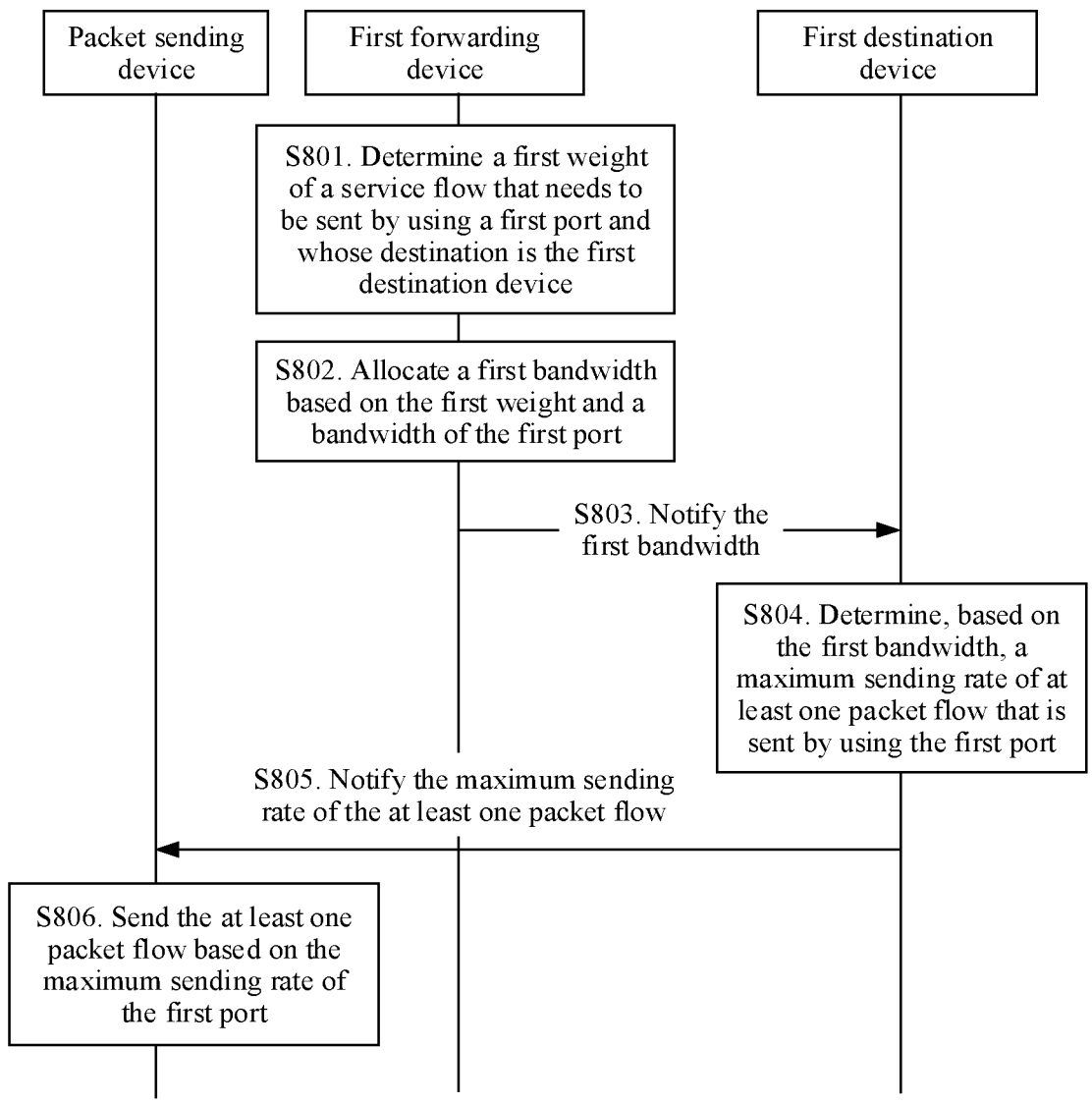
FIG. 8 is an interaction diagram of an example congestion control processing method according to an embodiment of this application.

FIG. 8 is an interaction diagram of an example congestion control processing method 800 according to an embodiment of this application.

The flowchart shown in FIG. 8 relates to a source device (such as a packet sending device), forwarding devices (such as a first forwarding device, a second forwarding device, and a third forwarding device), and a destination device (such as a first destination device). The source device is configured to generate a packet flow, the forwarding device is configured to forward the packet flow, and the destination device is configured to receive the packet flow forwarded by the forwarding device. It should be noted that there may be a plurality of source devices, a plurality of forwarding devices, and a plurality of destination devices, and any source device may send a packet flow to any destination device. In addition, the source device may send one packet flow or a plurality of packet flows to the destination device. It should be understood that device forms and quantities of packet sending devices, forwarding devices, and destination devices are not limited in this application.

A concept of a weight is involved in the flowchart shown in FIG. 8. In this application, a weight may also be referred to as a value. Unless otherwise specified, the weight mentioned in this application is a positive number. Further, the source device may determine a weight for each packet flow sent by the source device. For example, a relatively small value is determined for an elephant flow, and a relatively large value is determined for a mice flow. The source device notifies the forwarding device of the weight of the packet flow.

For example, the source device may include, to a packet flow to be sent to the forwarding device, a weight of the packet flow. Correspondingly, the forwarding device may learn of a weight of each packet flow in a plurality of packet flows, and may further determine a port used to forward each packet flow in the plurality of packet flows. Further, the forwarding device may determine, based on a destination address of a packet flow, a weight of the packet flow, and a port used to forward the packet flow, weights of packet flows that need to be forwarded by using a same port and that are destined for a same destination device.

It should be understood that destination addresses of packet flows that need to be forwarded by using a same port may be a plurality of destination addresses, and the plurality of destination addresses are respectively corresponding to a plurality of destination devices. In addition, there may be one packet flow or may be a plurality of packet flows that needs or need to be forwarded by using a same port and that is or are destined for one of the plurality of destination devices.

For example, packet flows that need to be forwarded by using a port 1 and that are destined for a destination device 1 include a packet flow 1 and a packet flow 2, and a packet flow that needs to be forwarded by using the port 1 and that is destined for a destination device 2 includes only a packet flow 3. A weight determined by a source device sending the packet flow 1 for the packet flow 1 is 1.5, a weight determined by a source device sending the packet flow 2 for the packet flow 2 is 2.5, and a weight determined by a source device sending the packet flow 3 for the packet flow 3 is 2. The source device of the packet flow 1 and the source device of the packet flow 2 may be a same source device or different source devices. The source device of the packet flow 2 and the source device of the packet flow 3 may be a same source device or different source devices. The source device of the packet flow 1 and the source device of the packet flow 3 may be a same source device or different source devices. Further, the forwarding device may determine that a weight of packet flows that need to be sent by using the port 1 and that are destined for the destination device 1 is equal to 4 (that is, a sum of the weight 1.5 of the packet flow 1 and the weight 2.5 of the packet flow 2). The forwarding device may determine that a weight of a packet flow that needs to be sent by using the port 1 and that is destined for the destination device 2 is equal to 2 (that is, the weight 2 of the packet flow 3).

It is assumed that packet flows that the forwarding device needs to send by using the port 1 include only the packet flow 1, the packet flow 2, and the packet flow 3. The forwarding device may determine, based on the weight of the packet flow that needs to be sent by using the port 1 and that is destined for the destination device 1, the weight of the packet flow that needs to be sent by using the port 1 and that is destined for another destination device (that is, the destination device 2), and a total bandwidth of the port 1, a bandwidth allocated by the forwarding device to the packet flow that needs to be sent by using the port 1 and that is destined for the destination device 1.

In a possible implementation, the bandwidth allocated by the forwarding device to the packet flow that needs to be sent by using the port 1 and that is destined for the destination device 1 is equal to the total bandwidth of the port 1 by multiplying by a quotient obtained after the weight of the packet flow that needs to be sent by using the port 1 and that is destined for the destination device 1 is divided by a sum of weights of packet flows that need to be sent by using the port 1 and that are destined for all destination devices. For example, the total bandwidth of the port 1 60 Gbps is multiplied by a quotient obtained after the weight 4 of the packet flow that needs to be sent by using the port 1 and that is destined for the destination device 1 is divided by the sum, that is, 4+2=6, of the weight of the packet flows that need to be sent by using the port 1 and that are destined for all the destination devices. Further, the bandwidth allocated by the forwarding device to the packet flow that needs to be sent by using the port 1 and that is destined for the destination device 1 is 60×(4÷6)=40 Gpbs. The bandwidth allocated by the forwarding device to the packet flow that needs to be sent by using the port 1 and that is destined for the destination device 2 is 60×(2÷6)=20 Gpbs.

It should be noted that the forwarding device allocates the bandwidth from a perspective of the destination devices (for example, the destination device 1 and the destination device 2), and does not allocate bandwidth from a perspective of the packet flows (for example, the packet flow 1, the packet flow 2, and the packet flow 3). The forwarding device may notify the destination device 1 of the bandwidth (for example, 40 Gbps) allocated by the forwarding device to the packet flow that needs to be sent by using the port 1 and that is destined for the destination device 1. In addition, the source device may notify the destination device of the weight of the packet flow. For example, the weight (for example, 1.5) of the packet flow 1 and the weight (for example, 2.5) of the packet flow 2 are notified to the destination device 1. The destination device 1 may determine, based on the weight of each packet flow that is determined from the source device and the bandwidth (for example, 40 Gbps) determined from the forwarding device and allocated by the forwarding device to the packet flow that needs to be sent by using the port 1 and that is destined for the destination device 1, a maximum sending rate of each packet flow received by the destination device 1. For example, a maximum sending rate of the packet flow 1 is equal to the bandwidth allocated by the forwarding device to the packet flow that needs to be sent by using the port 1 and that is destined for the destination device 1 by multiplying by a quotient obtained after the weight of the packet flow 1 is divided by a sum of the weight of the packet flow 1 and the weight of the packet flow 2. Further, the maximum sending rate of the packet flow 1 is 40×1.5÷4=15 Gbps. A maximum sending rate of the packet flow 2 is 40×2.5÷4=25 Gbps. That is, the maximum sending rate of the packet flow 1 is equal to 15 Gbps, and the maximum sending rate of the packet flow 2 is equal to 25 Gbps.

The destination device may notify the source device of the maximum sending rate of each packet flow that is determined by the destination device, so that the source device may send a corresponding packet flow to the destination device at a sending rate less than or equal to the maximum sending rate. For example, the destination device 1 may notify the source device (for example, a source device 1) of the packet flow 1 of the maximum sending rate (for example, 15 Gbps) of the packet flow 1. The destination device 1 may notify the source device (for example, a source device 2) of the packet flow 2 of the maximum sending rate (for example, 25 Gbps) of the packet flow 2. The source device 1 may send the packet flow 1 to the destination device 1 at a sending rate less than or equal to 15 Gbps. The source device 2 may send the packet flow 2 to the destination device 1 at a sending rate less than or equal to 25 Gbps.

The concept of the weight is described above. Further, each step in method 800 is described in detail with reference to the interaction diagram shown in FIG. 8. As shown in FIG. 8, the method 800 may include S801-S806.

S801. A forwarding device determines a first weight of a service flow that needs to be sent by using a first port and whose destination is a first destination device.

For example, the first port may be an Ethernet port. A total bandwidth of the Ethernet port may be 100 Gbps, 200 Gbps, or 400 Gbps. The total bandwidth refers to a maximum sending rate of the port. For example, when the total bandwidth of the first port is 100 Gbps, a maximum sending rate of the first port is 100 Gbps. An actual sending rate of the first port is less than or equal to 100 Gbps.

Figure 9:
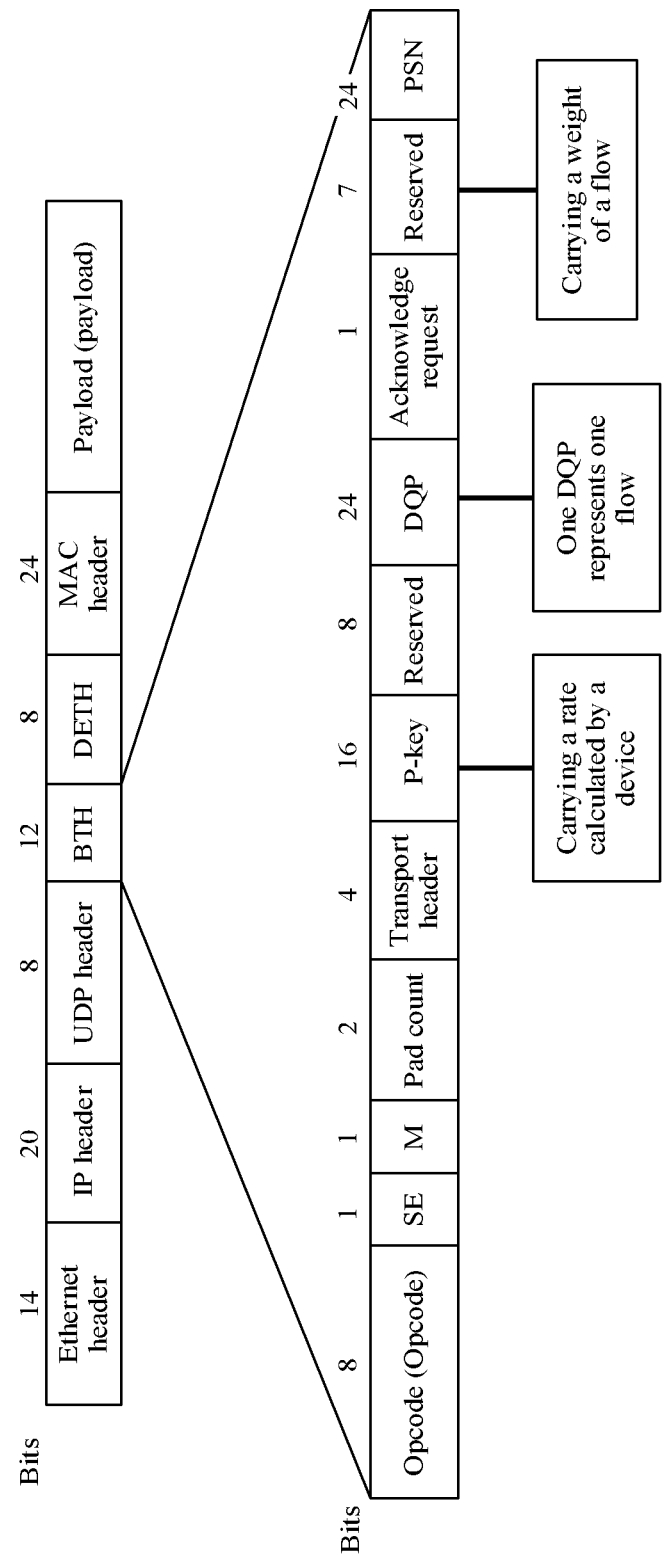
FIG. 9 is a schematic diagram of an example data packet format applicable to an embodiment of this application.
Figure 10:
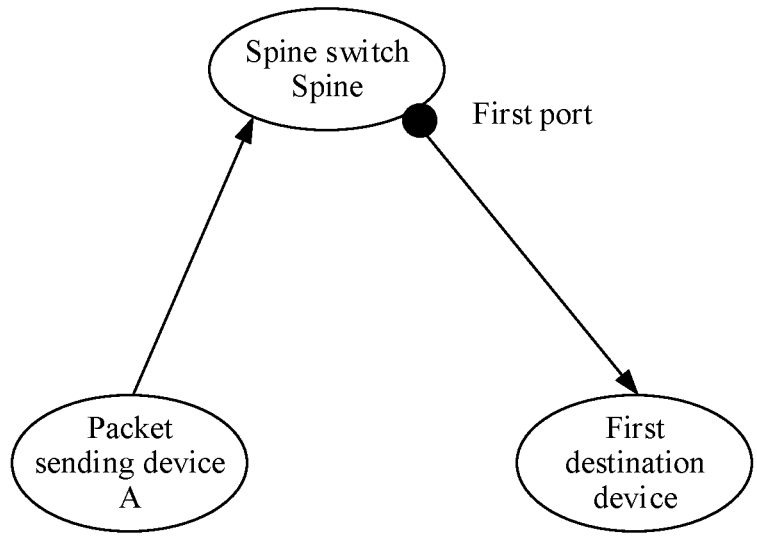
FIG. 10, FIG. 11, FIG. 12, FIG. 13, and FIG. 14 are schematic diagrams of ports according to an embodiment of this application.
Figure 11:
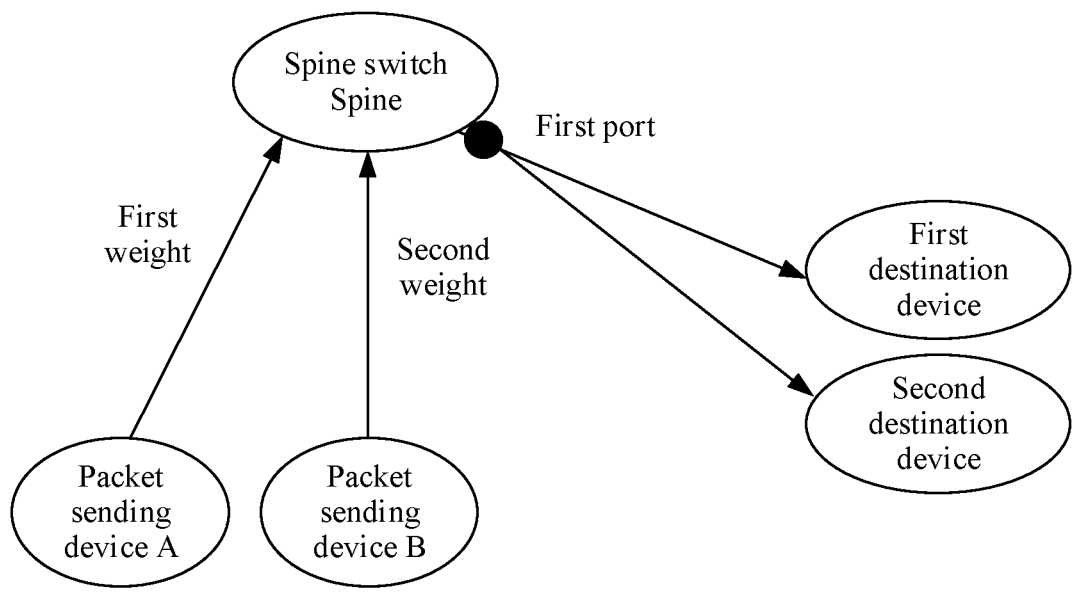
Figure 12:
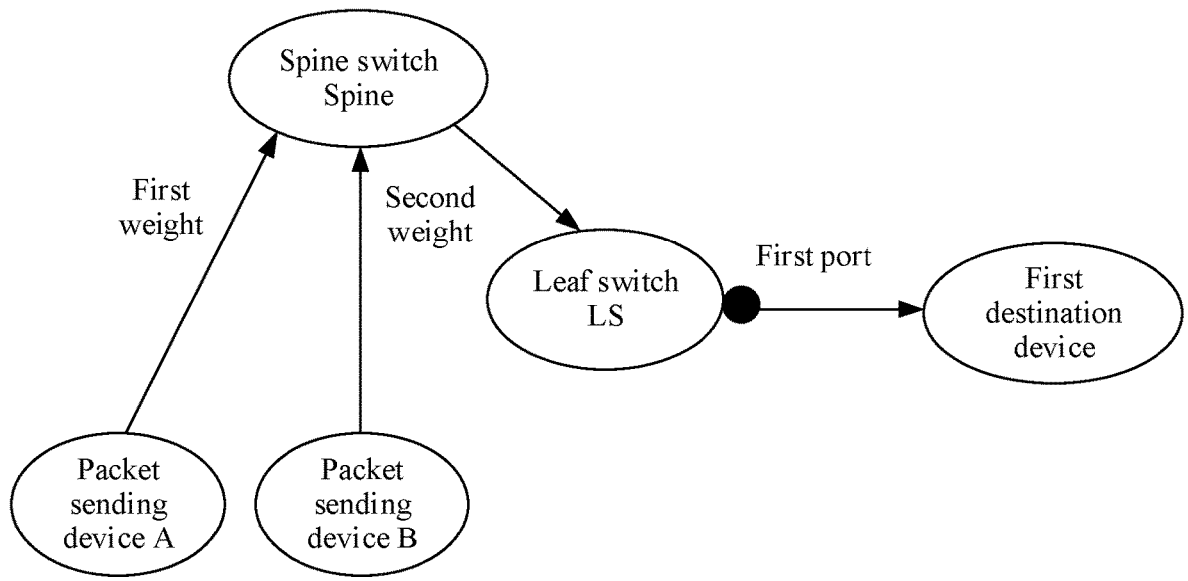
Figure 13:
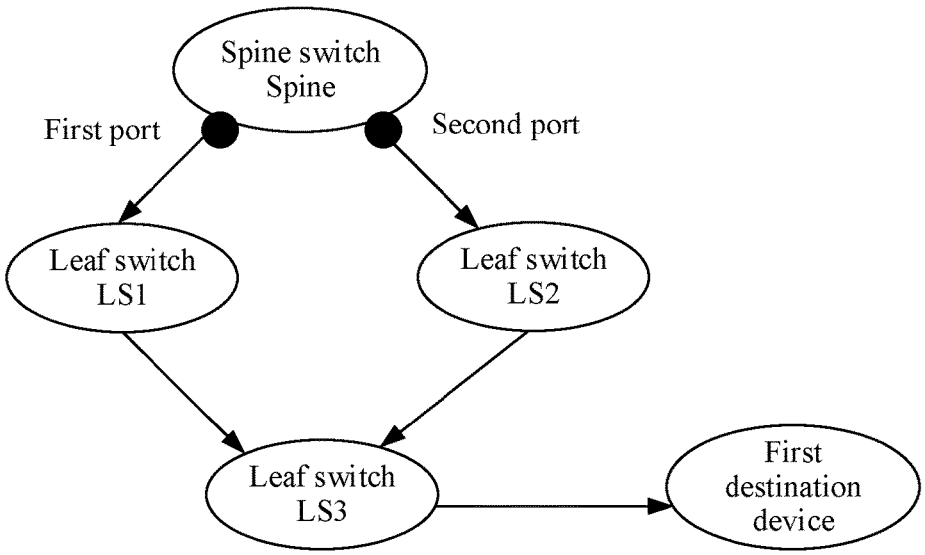

FIG. 9 is a schematic diagram of an example data packet format applicable to an embodiment of this application. FIG. 9 shows a format of an example RoCE packet, and the packet includes an Ethernet header, an IP header, a User Datagram Protocol (UDP) header, and other data fields. For example, there is an InfiniBand (IB) base transport header (BTH). The BTH field may include a plurality of fields, for example, a P-KEY field that is used to carry a device computing rate and occupies 16 bits, and a destination queue pair (Dest QP) used to distinguish between service flows, where the Dest QP field may carry L4 layer information, a source port number is not carried and is stored in a protocol stack, and one Dest QP represents one flow. A reserved field may be used to carry a weight of a service flow. The fields in the RoCEv2 packet may be used to carry information such as a weight, a bandwidth, and a maximum sending rate in the embodiments of this application. It should be understood that in addition to the RoCEv2 packet, there may be another possible packet format, which is not limited in this application.

It should be understood that a packet flow in this application refers to a set of a plurality of packets that have a same feature. The packet in the packet flow may be an RoCE packet. For example, the packet in the packet flow may be an RoCEv2 packet. Different packet flows have different features, and the features may be one field or a plurality of fields in a packet header.

When the feature is one field, the field may be a destination IP address. For example, a plurality of packets whose destination IP addresses are IP1 constitute a packet flow 1, a plurality of packets whose destination IP addresses are IP2 constitute a packet flow 2, and IP1 is not equal to IP2.

Alternatively, when the feature is a plurality of fields, the fields may include a source IP address and a destination IP address. For example, a plurality of packets whose source IP addresses and destination IP addresses are respectively IP3 and IP4 constitute a packet flow 3, a plurality of packets whose source IP addresses and destination IP addresses are respectively IP5 and IP6 constitute a packet flow 4, and IP3 is not equal to IP5, or IP4 is not equal to IP6.

In other examples, the packet flow may alternatively be defined by another feature. For example, the packet flow may be defined by a 5-tuple. The 5-tuple may include a source IP address, a destination IP address, a source port, a destination port, and a protocol number. The source IP address, the destination IP address, and the protocol number may be carried in an IP header of a packet. The source port and the destination port may be carried in a TCP header or a UDP header.

In a possible design, the feature of the packet flow may be a four-tuple. The four-tuple includes a source IP address, a destination IP address, a protocol number, and a Dest QP. It may be understood that the source IP address, the destination IP address, and the protocol number may be carried in an IP header of an RoCEv2 packet. The Dest QP may be carried in an IB BTH of the RoCEv2 packet.

In addition, a service flow in this application may also be referred to as a packet flow, and different service flows have different features. For example, a service flow may include a plurality of RoCEv2 packets with a same feature. The feature of the RoCEv2 packet may be defined by a four-tuple. The four-tuple may include a source IP address, a destination IP address, a protocol number, and a Dest QP.

S802. The forwarding device allocates a first bandwidth based on the first weight and the total bandwidth of the first port, where the first bandwidth is a bandwidth allocated to the service flow that needs to be sent by using the first port and whose destination is the first destination device.

It should be further understood that the first port is an egress port of the forwarding device, and the forwarding device sends a received packet flow through at least one egress port. There may be one or more egress ports. For different combination connection manners of a packet sending device, the forwarding device, and the destination device, the first port in this application is also corresponding to different cases.

It may be understood that the first bandwidth is equal to a maximum sending rate at which the forwarding device sends the service flow destined for the first destination device by using the first port, that is, a sending rate of the service flow. In specific implementation of S801 and S802, the forwarding device may analyze packets received in a time period, so as to determine the first weight. For example, the time period may be 100 microseconds. The forwarding device receives 10 packets in a time period. The 10 packets respectively belong to 10 packet flows. The forwarding device parses packet headers of the 10 packets to determine that destinations of two of the 10 packets are the first destination device. The forwarding device stores a forwarding table. The forwarding table includes a plurality of entries, and each entry includes a destination address and an egress port. The forwarding device determines, by looking up the forwarding table, that egress ports of the two packets are the first port.

In a possible design, each packet in the 10 packets includes a weight of a packet flow corresponding to the packet. The weight may be determined, based on a quantity of packets included in the packet flow, by a packet sending device that generates the packet flow. For example, a packet sending device 1 can send the packet flow 1. When the packet sending device 1 sends the first packet in the packet flow 1, a weight determined by the packet sending device 1 for the packet flow 1 is 1. When the packet sending device 1 sends the 11th packet in the packet flow 1, a weight determined by the packet sending device 1 for the packet flow 1 is 2. When the packet sending device 1 sends the 101st packet in the packet flow 1, a weight determined by the packet sending device 1 for the packet flow 1 is 3. That is, in different cases, the packet sending device 1 may determine different weights for the same packet flow 1.

In addition, when generating the packet flow 1, the packet sending device may add the weight to the packet of the packet flow 1. For example, the packet sending device 1 may add the weight whose value is equal to 1 to the first packet of the packet flow 1, add the weight whose value is equal to 2 to the 11th packet of the packet flow 1, and add the weight whose value is equal to 3 to the 101st packet of the packet flow 1. For example, the packet in the packet flow 1 may be an RoCEv2 packet. The weight may be carried in a reserved field of the IB BTH. Further, the weight may be carried in a reserved field between an acknowledge request field and a packet sequence number (PSN) field.

The forwarding device may determine, based on a weight of a packet flow, a destination address of the packet flow, and a port used by the forwarding device to forward the packet flow, the weight of the packet flow that needs to be forwarded by using a port and that is destined for a destination device. For example, in a time period, the forwarding device receives a packet 1, a packet 2, and a packet 3. The packet 1, the packet 2, and the packet 3 respectively belong to the packet flow 1, the packet flow 2, and the packet flow 3, where destinations of the packet flow 1 and the packet flow 2 are the first destination device, and a destination of the packet flow 3 is another destination device. A weight carried in the packet 1 is 1, a weight carried in the packet 2 is 2, and a weight carried in the packet 3 is 3. The forwarding device determines, based on the packet 1 and the packet 2, that packet flows that need to be sent by using the first port and whose destinations are the first destination device are the packet flow 1 and the packet flow 2, and the forwarding device determines, based on the packet 3, that a packet flow that needs to be sent by using the first port and whose destination is the other destination device is the packet flow 3.

In other words, the forwarding device determines that a quantity of packet flows that need to be sent by using the first port and whose destinations are the first destination device is 2, and the forwarding device determines that a quantity of packet flows that need to be sent by using the first port and whose destinations are the other destination device is 1. The forwarding device determines, based on the weights carried in the packet 1 and the packet 2, that a weight of the packet flows that need to be forwarded by using the first port and that are destined for the first destination device is a sum (for example, 3) of the weight of the packet flow 1 and the weight of the packet flow 2. The forwarding device determines, based on the weights carried in the packet 1, the packet 2, and the packet 3, that a weight of the packet flows that need to be forwarded by using the first port and that are destined for all the destination devices is a sum (for example, 6) of the weight of the packet flow 1, the weight of the packet flow 2, and the weight of the packet flow 3.

It is assumed that the total bandwidth of the first port is 100 Gbps, and the first bandwidth may be a bandwidth allocated by the forwarding device to the first destination device. The first bandwidth allocated by the forwarding device to the first destination device is equal to the total bandwidth of the first port by multiplying by a quotient obtained after the weight of the packet flows arriving at the first destination device is divided by the weight of the packet flows arriving at all the destination devices. For example, 100 Gbps×3÷6=50 Gbps. Therefore, the bandwidth allocated by the forwarding device to the first destination device is 50 Gbps.

In addition, as mentioned above, in different cases, the packet sending device may determine different weights for a same packet flow. Therefore, in different cases, the forwarding device may determine, based on different weights of a same packet flow, different weights of a packet flow that is sent by using a same port and whose destination is a same destination device.

For example, the forwarding device receives, in a next time period, a packet 4, a packet 5, and a packet 6 that respectively belong to the packet flow 1, the packet flow 2, and the packet flow 3, where the next time period may be 100 milliseconds, and the next time period and the foregoing time period are adjacent periods. A weight carried in the packet 4 is 1 (equal to the weight carried in the packet 1), a weight carried in the packet 5 is 3 (different from the weight carried in the packet 2), and a weight carried in the packet 6 is 3 (equal to the weight carried in the packet 3). The forwarding device determines that the quantity of packet flows that need to be sent by using the first port and whose destinations are the first destination device is 2, and determines that the quantity of packet flows that need to be sent by using the first port and whose destinations are the other destination device is 1. The forwarding device determines, based on the weights carried in the packet 4 and the packet 5, that the weight of the packet flows that need to be forwarded by using the first port and that are destined for the first destination device is the sum (for example, 4) of the weight of the packet flow 1 and the weight of the packet flow 2.

The forwarding device determines, based on the weights carried in the packet 4, the packet 5, and the packet 6, that the weight of the packet flows that need to be forwarded by using the first port and that are destined for all the destination devices is a sum (for example, 7) of the weight of the packet flow 1, the weight of the packet flow 2, and the weight of the packet flow 3.

It is assumed that the total bandwidth of the first port is 100 Gbps, and the first bandwidth is the bandwidth allocated by the forwarding device to the first destination device. The first bandwidth allocated by the forwarding device to the first destination device is equal to the total bandwidth (for example, 100 Gbps) of the first port by multiplying by a quotient obtained after the weight (for example, 4) of the packet flows arriving at the first destination device is divided by the weight (for example, 7) of the packet flows arriving at all the destination devices. Therefore, the bandwidth allocated by the forwarding device to the first destination device may be 400/7 Gbps, and the bandwidth allocated by the forwarding device to the other destination device may be 300/7 Gbps. That is, in the total bandwidth of the first port of the forwarding device, the bandwidth allocated to the first destination device is equal to 400 Gbps/7, and the bandwidth allocated to the other destination device is equal to 300 Gbps/7.

In the foregoing implementation, the packet flows to which the packets that are received in the foregoing time period, that need to be sent by using the first port, and whose destinations are the first destination device belong are the same as the packet flows to which the packets that are received in the next time period, that need to be sent by using the first port, and whose destinations are the first destination device belong, and the packet flows to which the packets belong include the packet flow 1 and the packet flow 2.

In another implementation, the packet flows to which the packets that are received in the foregoing time period, that need to be sent by using the first port, and whose destinations are the first destination device belong may be different from the packet flows to which the packets that are received in the next time period, that need to be sent by using the first port, and whose destinations are the first destination device belong. For example, the packet flows to which the packets that are received in the foregoing time period, that need to be sent by using the first port, and whose destinations are the first destination device belong include the packet flow 1 and the packet flow 2. The packet flows to which the packets that are received in the next time period, that need to be sent by using the first port, and whose destinations are the first destination device belong include the packet flow 1 and the packet flow 3.

In another possible implementation, the forwarding device may receive a plurality of packet flows sent by the packet sending device, and the plurality of packet flows may include a same destination address or may include different destination addresses. For example, the plurality of packet flows are packet flows destined for the first destination device or packet flows destined for a plurality of destination addresses.

When the forwarding device sends a plurality of packet flows to the first destination device, a set including the plurality of packet flows is referred to as a "first set", that is, the plurality of packet flows included in the first set are service flows that need to be sent to the first destination device by using the first port. The forwarding device determines a plurality of weights that are in a one-to-one correspondence with the plurality of packet flows included in the first set, and the forwarding device determines the first weight based on the plurality of weights that are in a one-to-one correspondence with the plurality of packet flows included in the first set, where the first weight is equal to a sum of the plurality of weights that are in a one-to-one correspondence with the plurality of packet flows included in the first set.

For example, all destination addresses of M packet flows are the first destination device, all the M packet flows are sent to the first destination device by using the first port, the M packet flows correspond to M weights, and the first weight is equal to a sum of the M weights that are in a one-to-one correspondence with the M packet flows. When M is 1, that is, when the forwarding device sends one packet flow to the destination device by using the first port, the packet flow corresponds to one weight, that is, the first weight. When M is greater than or equal to 1, that is, when the forwarding device sends the M packet flows to the destination device by using the first port, the M packet flows correspond to M weights, and a sum of the M weights is the first weight.

In a possible implementation, the forwarding device may determine the first weight by summing up the M weights carried in the M packets. Further, the forwarding device receives the M packets, where the M packets carry the M weights that are in a one-to-one correspondence with the M packet flows included in the first set, each packet in the M packets carries one weight, and the M packets respectively belong to the M packet flows.

Optionally, the first packet (the initial packet) of each packet flow may carry one piece of weight information. For example, the IB BTH field of the foregoing described RoCEv2 packet may be used to carry weight information.

In a possible implementation, the forwarding device determines another weight of a service flow that needs to be sent by using the first port and whose destination is another device. The other device is a destination device other than the first destination device. The forwarding device allocates the first bandwidth based on the first weight, the other weight, and the total bandwidth of the first port, where the first bandwidth is equal to the total bandwidth of the first port× the first weight/(the first weight+the other weight).

In a possible implementation, the packet sending device may allocate different weights to different packet flows. The weight determined by the forwarding device is allocated by the packet sending device and notified to the forwarding device. For example, the plurality of weights that are in a one-to-one correspondence with the plurality of packet flows included in the first set are allocated by a packet sending device that sends the plurality of packet flows included in the first set.

Optionally, the plurality of packet flows included in the first set may correspond to different priorities. For example, the plurality of packet flows included in the first set may include an elephant flow and a mice flow. A quantity of bits included in the elephant flow is greater than a quantity of bits included in the mice flow, and a weight corresponding to the elephant flow is less than a weight corresponding to the mice flow.

In a possible implementation, the elephant flow is data, and the mice flow is signaling. For example, the data may be a data frame of an audio or a video. Correspondingly, signaling may be a request message initiated by a user, and the request message is used to request to obtain the data frame of the audio or the video from a cloud. A form of a flow, a priority of a flow, and weights of different flows are not limited in this application. For different flows and weights, the forwarding device may allocate the bandwidth by using the method provided in this application.

Further, FIG. 9 to FIG. 13 are schematic diagrams of a possible port according to an embodiment of this application. For a possible form of the port, the forwarding device may determine, based on a weight of a packet flow, a destination address of the packet flow, and a port used by the forwarding device to forward the packet flow, a weight of a packet flow that needs to be forwarded by using the port and that is destined for a destination device. Further, a calculation process of the first weight and a determining process of the first bandwidth are enumerated in the following five cases:

Case 1:

A packet sending device is connected to one forwarding device, and the forwarding device is connected to one destination device by using a first port. Further, in a case shown in FIG. 10, a packet sending device A is connected to an SS (or spine), and the spine is connected to a first destination device. In this case, the first port is a port used by the spine to send a packet flow to the first destination device. In this case, referring to the foregoing described determining process of the first weight, when the forwarding device sends one packet flow to the destination device by using the first port, the packet flow corresponds to one weight, that is, the first weight. When the forwarding device sends M packet flows to the destination device by using the first port, the M packet flows correspond to M weights, and a sum of the M weights is the first weight.

For example, in a time period, the spine receives a packet 1, a packet 2, and a packet 3. The packet 1, the packet 2, and the packet 3 respectively belong to a packet flow 1, a packet flow 2, and a packet flow 3, where all destinations of the packet flow 1, the packet flow 2, and the packet flow 3 are the first destination device. A weight carried in the packet 1 is 1, a weight carried in the packet 2 is 2, and a weight carried in the packet 3 is 3. The spine determines, based on the packet 1, the packet 2, and the packet 3, that packet flows that need to be sent by using the first port and whose destinations are the first destination device are the packet flow 1, the packet flow 2, and the packet flow 3. The spine determines that a quantity of packet flows that need to be sent by using the first port and whose destinations are the first destination device is 3, and determines, based on the weights carried in the packet 1, the packet 2, and the packet 3, that a weight of the packet flows that need to be forwarded by using the first port and that are destined for the first destination device is a sum of the weights of the packet flow 1, the packet flow 2, and the packet flow 3, that is, 1+2+3=6.

Correspondingly, the spine device allocates a first bandwidth to a service flow that needs to be sent by using the first port and whose destination is the first destination device, a product of the first weight and a total bandwidth of the first port is the first bandwidth, and the spine sends, by using the first port, the packet flow whose destination is the first destination device at a rate corresponding to the first bandwidth.

It is assumed that the total bandwidth of the first port is 100 Gbps, and the first bandwidth may be a bandwidth allocated by the forwarding device to the first destination device. The first bandwidth allocated by the forwarding device to the first destination device is equal to the total bandwidth of the first port by multiplying by a quotient obtained after the weight of the packet flows arriving at the first destination device is divided by the weight of the packet flows arriving at all the destination devices. For example, 100 Gbps×6÷6=100 Gbps. Therefore, the bandwidth allocated by the forwarding device to the first destination device is 100 Gbps.

Case 2:

At least two packet sending devices are connected to one forwarding device, and the forwarding device is connected to at least two destination devices by using a first port. Further, in a case shown in FIG. 11, a packet sending device A and a packet sending device B are connected to an SS (or spine), and the spine is connected to a first destination device and a second destination device by using the first port. In this case, the first port is a port used by the spine to send a packet flow to the first destination device and the second destination device.

In this case, the spine determines that a weight that needs to be sent by using the first port and whose destination is the first destination device is a first weight, and a weight of a service flow that needs to be sent by using the first port and whose destination is the second destination device is a second weight, and the spine device allocates a first bandwidth to the service flow that needs to be sent by using the first port and whose destination is the first destination device, where the first bandwidth is equal to a total bandwidth of the first port× the first weight/(the first weight+the second weight).

For example, in a time period, the forwarding device receives a packet 1, a packet 2, and a packet 3. The packet 1, the packet 2, and the packet 3 respectively belong to a packet flow 1, a packet flow 2, and a packet flow 3, where destinations of the packet flow 1 and the packet flow 2 are the first destination device, and a destination of the packet flow 3 is the second destination device. A weight carried in the packet 1 is 1, a weight carried in the packet 2 is 2, and a weight carried in the packet 3 is 3. The spine determines, based on the packet 1 and the packet 2, that packet flows that need to be sent by using the first port and whose destinations are the first destination device are the packet flow 1 and the packet flow 2, and determines, based on the packet 3, that a packet flow that needs to be sent by using the first port and whose destination is the second destination device is the packet flow 3. The spine determines that a quantity of packet flows that need to be sent by using the first port and whose destinations are the first destination device is 2, determines that a quantity of packet flows that need to be sent by using the first port and whose destinations are the second destination device is 1, determines, based on the weights carried in the packet 1 and the packet 2, that a weight of the packet flows that need to be forwarded by using the first port and that are destined for the first destination device is a sum of the weights of the packet flow 1 and the packet flow 2, that is, 1+2=3, and determines, based on the weight carried in the packet 3, that a weight of the packet flow that needs to be forwarded by using the first port and that is destined for the second destination device is the weight of the packet flow 3, that is, 3.

It should be understood that the spine may determine a plurality of service flows, such as the foregoing described M service flows, that need to be sent by using the first port and whose destinations are the first destination device. In this case, refer to the determining of the first weight in case 1, and the second weight can be obtained similarly. Details are not described herein again.

In addition, in a time period, the spine may receive a packet destined for only the first destination device, or in a time period, the spine receives packets destined for both the first destination device and another destination device (for example, the second destination device). However, the spine may determine, by using a lookup table (for example, a routing table), that a packet that needs to be forwarded by using the first port includes only a packet whose destination address is the first destination device, or may determine the first bandwidth by using the foregoing method.

It is assumed that the total bandwidth of the first port is 100 Gbps, and the first bandwidth may be a bandwidth allocated by the forwarding device to the first destination device. The first bandwidth allocated by the forwarding device to the first destination device is equal to the total bandwidth of the first port by multiplying by a quotient obtained after the weight of the packet flows arriving at the first destination device is divided by the weight of the packet flows arriving at all the destination devices. For example, 100 Gbps×3÷6=50 Gbps. Therefore, the bandwidth allocated by the forwarding device to the first destination device is 50 Gbps, and a bandwidth allocated to the second destination device is 50 Gbps.

Case 3:

At least two packet sending devices are connected to one forwarding device, and the forwarding device includes at least two levels of network devices, which are then connected to a destination device by using a first port. Further, in a case shown in FIG. 12, a packet sending device A and a packet sending device B are connected to an SS (or spine), the spine is connected to an LS, and the LS is connected to a first destination device by using the first port. In this case, the first port is a port used by the LS to send a packet flow to the first destination device.

In this case, the spine determines that a weight that needs to be sent by the packet sending device A by using the first port and whose destination is the first destination device is a first weight, and a weight of a service flow that is sent by the packet sending device B by using the first port and whose destination is the first destination device is a second weight. The spine device allocates a first bandwidth to the service flow that needs to be sent by using the first port and whose destination is the first destination device, where the first bandwidth allocated by the spine to the service flow sent by the packet sending device A is equal to a total bandwidth of the first port× the first weight (the first weight+the second weight), and the first bandwidth allocated by the spine to the service flow sent by the packet sending device B is equal to the total bandwidth of the first port× the second weight (the first weight+the second weight).

It should be understood that for case 3, refer to the determining process in case 1, and details are not described herein again.

Case 4:

A packet sending device is connected to one forwarding device, and the forwarding device includes at least two levels of network devices, which are then connected to a destination device. That is, the forwarding device is not directly connected to a first destination device, and may be connected to a next level of network device by using a plurality of ports, and then send traffic to the first destination device. In this case, a first port may be a port between central network devices. Further, in a case shown in FIG. 13, an SS (or spine) is connected to an LS1 by using the first port and is connected to an LS2 by using a second port. The LS1 and the LS2 may be connected to an LS3, or may be directly connected to the first destination device. In this case, the spine may send a packet flow whose destination is the first destination device by using at least two ports, and the first port is a port used by the spine to send a packet flow to a next level of forwarding device.

The forwarding device determines a service flow that does not need to be sent by using the first port and whose destination is not the first destination device, and the forwarding device may determine that the first bandwidth is equal to a total bandwidth of the first port. Alternatively, when the forwarding device is directly connected to the first destination device, the first port may be used only to connect to the first destination device, and the forwarding device may determine that the first bandwidth is equal to the total bandwidth of the first port.

In this case, the spine may send a packet flow based on a total bandwidth of each port, for example, send a packet flow whose destination is the first destination device by using the total bandwidth of the first port.

In addition, similarly, the spine further needs to determine a second weight of a service flow that needs to be sent by using the second port and whose destination is the first destination device, and allocates, based on the second weight and a total bandwidth of the second port, a second bandwidth to the service flow that needs to be sent by using the second port and whose destination is the first destination device.

Figure 14:
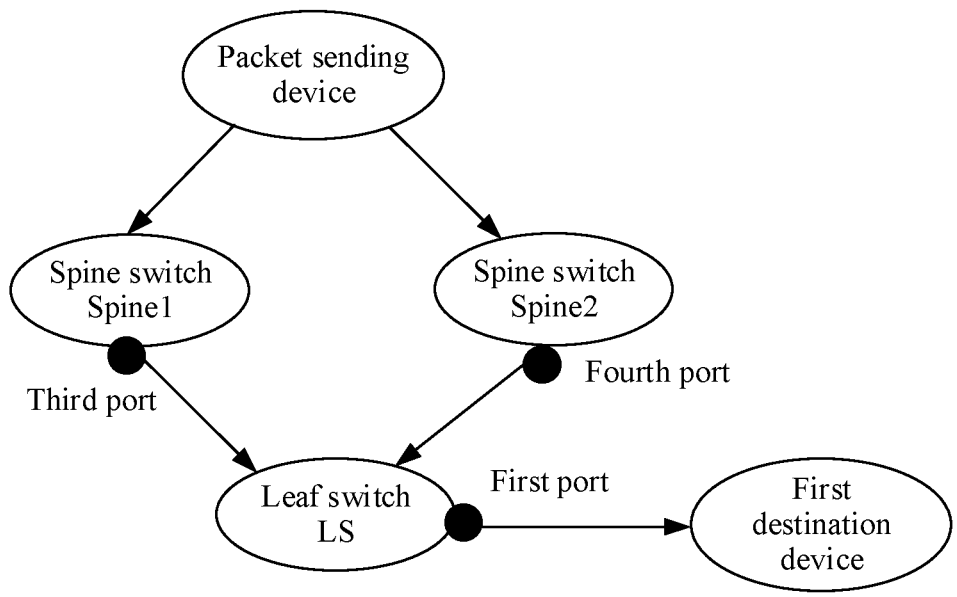

Case 5:

Similar to case 4, a packet sending device is connected to one forwarding device, and the forwarding device includes at least two levels of network devices, which are then connected to a destination device. In this case, a first port may also be a port used by a central network device to connect to the destination device. Further, in a case shown in FIG. 14, for example, a spine 1 is connected to an LS by using a third port, a spine 2 is connected to the LS by using a fourth port, and the LS is connected to a first destination device by using the first port. In this case, the LS may receive packet flows that are sent by two forwarding devices and whose destinations are the first destination device, and then send the packet flows to the first destination device by using the first port, where the first port is a port used by the LS to send the packet flows to the destination device.

If it is assumed that a bandwidth allocated by the spine 1 to a service flow that needs to be sent by using the third port and whose destination is the first destination device is a third bandwidth, and a bandwidth allocated by the spine 2 to a service flow that needs to be sent by using the fourth port and whose destination is the first destination device is a fourth bandwidth. The first bandwidth includes a first sub-bandwidth and a second sub-bandwidth. The LS sends, to the first destination device by using the first sub-bandwidth, the service flow that needs to be sent by using the third port and whose destination is the first destination device, and the LS sends, to the first destination device by using the second sub-bandwidth, the service flow that needs to be sent by using the fourth port whose destination is the first destination device. Then, in a process of allocating a bandwidth to the first port, the first sub-bandwidth, the second sub-bandwidth, the third bandwidth, and the fourth bandwidth may have the following relationships.

For example, when the total bandwidth of the first port is greater than or equal to a sum of the third bandwidth and the fourth bandwidth, the first sub-bandwidth is equal to the third bandwidth, and the second sub-bandwidth is equal to the fourth bandwidth. That is, the LS directly sends the service flow by using the received third bandwidth of the service flow sent by the spine1, and sends the service flow by using the received fourth bandwidth of the service flow sent by the spine2.

Alternatively, when the total bandwidth of the first port is less than the sum of the third bandwidth and the fourth bandwidth, the first sub-bandwidth is equal to the total bandwidth of the first port× the third bandwidth/(the third bandwidth+the fourth bandwidth), and the second sub-bandwidth is equal to the total bandwidth of the first port× the fourth bandwidth/(the third bandwidth+the fourth bandwidth).

The foregoing lists various possible connection forms of the data center network and possible forms of the first port. It should be understood that, in the foregoing cases, a quantity and a form of a device are not limited, for example, a quantity of forwarding devices, and whether the forwarding device is an LS or a spine. This should not impose a limitation on the method provided in this embodiment of this application.

By using the foregoing various case examples of determining the bandwidth, for different connection forms of the data center network and different ports, a bandwidth allocated by the forwarding device to a service flow, for example, different bandwidths to a service flow of a single destination, a service flow of a plurality of destinations, and service flows from a plurality of forwarding devices or a plurality of packet sending devices may be determined, so as to implement flow-level scheduling of the data center network, maintain a state of each flow, implement network scheduling from a level of the forwarding device, and normalize a weight based on each flow, so as to allocate a proper bandwidth to each flow based on the weight, avoid congestion of an intermediate network, and eliminate possible congestion of the intermediate network, thereby laying a basis for scheduling at a receive end.

S803. The forwarding device notifies the first destination device of the first bandwidth.

Correspondingly, the first destination device receives the first bandwidth notified by the forwarding device, where the first bandwidth is a bandwidth allocated by the forwarding device to the service flow that needs to be sent by using the first port and whose destination is the first destination device.

In a specific implementation process of S803, the forwarding device may add the first bandwidth to the packet received from the packet sending device, and send the packet carrying the first bandwidth to the first destination device, so as to notify the first destination device of the first bandwidth.

For example, in a possible implementation of S801 and S802, the forwarding device determines, based on the metrics carried in the packet 3 and the packet 4, that a bandwidth allocated to the packet flow 1 is equal to 25 Gbps and a bandwidth allocated to the packet flow 2 is equal to 75 Gbps in the total bandwidth of the first port of the forwarding device. The forwarding device may add the bandwidth (25 Gbps) allocated to the packet flow 1 to an IB BTH of the packet 3, for example, to a P_KEY field of the packet 3. The forwarding device may add the bandwidth (75 Gbps) allocated to the packet flow 2 to an IB BTH of the packet 4, for example, to a P_KEY field of the packet 4. The forwarding device may send the packet 3 and the packet 4 that carry the bandwidths allocated by the forwarding device to the first destination device.

After receiving the packet 3 and the packet 4, the first destination device may determine the allocated bandwidths based on the packet 3 and the packet 4. In addition, the packet 3 and the packet 4 further carry the metrics. Therefore, by parsing the packet 3 and the packet 4, the first destination device may not only obtain the bandwidths notified by the forwarding device, but also obtain the metrics notified by the packet sending device. In this way, the first destination device may determine a maximum sending rate of a packet flow based on the bandwidths and the metrics of the channel.

In a possible implementation, the first forwarding device is connected to the first destination device by using the second forwarding device. For example, in case 3, case 4, and case 5 listed in S802, that is, the data center network includes at least two levels of network devices, and the first forwarding device notifies the second forwarding device of the first bandwidth, so that the second forwarding device allocates, based on the first bandwidth, a bandwidth to the service flow that needs to be sent by using the first port and whose destination is the first destination device.

Alternatively, for example, in case 1 and case 2 listed in S802, if the first forwarding device is not connected to the first destination device by using the second forwarding device, but is directly connected to the first destination device, the first forwarding device notifies the first destination device of the first bandwidth.

In the foregoing solution, for different connection forms of the data center network, for example, if the data center network includes one level of network device, the forwarding device directly notifies the destination device of the determined bandwidth. Alternatively, if the data center network includes at least two levels of network devices, the first forwarding device notifies the second forwarding device of the first bandwidth, so that the second forwarding device allocates, based on the first bandwidth, the bandwidth to the service flow that needs to be sent by using the first port and whose destination is the first destination device, so that the destination device determines a maximum sending rate of at least one packet flow that needs to be sent by using the first port, thereby implementing subsequent congestion control from the destination device side.

S804. The first destination device determines, based on the received first bandwidth sent by the forwarding device, a maximum sending rate of at least one packet flow that needs to be sent by using the first port, where the at least one packet flow is a packet flow in a service flow whose destination is the first destination device.

In specific implementation of S804, the first destination device may receive a plurality of packets in a time period by using the first port. The plurality of packets respectively belongs to a plurality of packet flows. Each packet carries a bandwidth allocated by the forwarding device to a corresponding packet flow.

In a possible implementation, when the first destination device receives only one packet flow sent by the forwarding device, that is, the forwarding device sends one packet flow to the destination device by using the first port, the packet flow corresponds to one weight, that is, the forwarding device sends the packet flow at a full rate.

In a possible implementation, when the first destination device receives only at least one packet flow sent by the forwarding device, and the at least one packet flow includes a plurality of packet flows, the first destination device determines a plurality of weights that are in a one-to-one correspondence with the plurality of packet flows, and determines a maximum sending rate of each packet flow in the plurality of packet flows based on the plurality of weights and the first bandwidth, where the maximum sending rate of each packet flow is equal to the first bandwidth×a weight of the packet flow/a sum of the weights of the plurality of packet flows.

For example, all destination addresses of M packet flows are the first destination device, and M is greater than or equal to 1. All the M packet flows are sent to the first destination device by using the first port, the M packet flows correspond to M weights, and the first weight is equal to a sum of the M weights that are in a one-to-one correspondence with the M packet flows. The destination device may determine the maximum sending rate of each packet flow by using the determined weights and the first bandwidth notified by the forwarding device.

In a possible implementation, when the first destination device receives a plurality of packet flows sent by the forwarding device, the first destination device receives a plurality of packets, each packet in the plurality of packets belongs to a different packet flow in the plurality of packet flows, the plurality of packets carries the plurality of weights, and each packet in the plurality of packets carries one weight.

Optionally, the first packet (the initial packet) of each packet flow may carry one piece of weight information. A location and a form of a packet that carries a weight are not limited in this application.

According to the foregoing technical solution, the destination device may receive the first bandwidth sent by the forwarding device, determine, based on the first bandwidth, the maximum sending rate at which the forwarding device sends the service flow by using the first port, and notify the source device of the maximum sending rate, so as to implement congestion control from the destination device side, and prevent network congestion caused by sending a packet flow at an excessively high rate. That is, after coarse-grained congestion control is implemented in the first aspect from a perspective of the forwarding device of the data center network, fine-grained congestion control is performed on the destination device side to control a sending rate of each packet flow destined for each destination device, and allocate a proper bandwidth to each flow. Network congestion of the intermediate network and the last hop is completely eliminated through end-network cooperation, and the intermediate network is easy to implement and is compatible with a plurality of scheduling policies.

Further, the first destination device may correspondingly determine a maximum sending rate of each flow in each scenario based on different port forms and device connection forms of the data center network. For example, the foregoing five cases of the possible schematic diagrams of the ports shown in FIG. 9 to FIG. 13 correspond to different rate determining processes. For simplicity, the following cases are directly corresponding to the foregoing five cases and accompanying drawings, and scenarios are not described again.

Case 1:

The first destination device receives one packet flow, where a weight corresponding to the packet flow is a first weight, and after receiving a first bandwidth notified by a forwarding device, the first destination device determines that a maximum sending rate of the packet flow is equal to a maximum sending rate corresponding to the first bandwidth.

Case 2:

The first destination device receives two packet flows sent by two packet sending devices, and weights corresponding to the two packet flows are a first weight and a second weight. After receiving a first bandwidth notified by a forwarding device, the first destination device determines that a maximum sending rate of the packet flow is equal to a maximum sending rate corresponding to the first bandwidth.

Case 3:

The first destination device receives two packet flows sent by two packet sending devices, and weights corresponding to the two packet flows are a first weight and a second weight. After receiving a first bandwidth notified by an LS, the first destination device determines that a maximum sending rate of the packet flow is equal to a rate corresponding to the first bandwidth×the first weight/(the first weight+the second weight).

Case 4:

After receiving a first bandwidth and a second bandwidth that are notified by an LS, the first destination device determines that a maximum sending rate of a packet flow sent by using a first port is equal to a rate corresponding to the first bandwidth×a first weight/(the first weight+a second weight), and determines that a maximum sending rate of a packet flow sent by using a second port is equal to a rate corresponding to the second bandwidth×the second weight/(the first weight+the second weight).

Case 5:

The first destination device receives a first bandwidth, a third bandwidth, and a fourth bandwidth that are notified by an LS, and the first bandwidth includes a first sub-bandwidth and a second sub-bandwidth. When a bandwidth of the first port is greater than or equal to a sum of the third bandwidth and the fourth bandwidth, the first sub-bandwidth is equal to the third bandwidth, and the second sub-bandwidth is equal to the fourth bandwidth. The first destination device receives a service flow that is sent by a first forwarding device by using the first sub-bandwidth, that needs to be sent by using a third port, and whose destination is the first destination device, and the first destination device receives a service flow that is sent by the first forwarding device by using the second sub-bandwidth, that needs to be sent by using a fourth port, and whose destination is the first destination device.

For example, the first destination device determines that a packet sending rate corresponding to the third bandwidth is a maximum sending rate of the service flow that needs to be sent by the forwarding device by using the third port and whose destination is the first destination device, and determines that a packet sending rate corresponding to the fourth bandwidth is a maximum sending rate of the service flow that needs to be sent by the forwarding device by using the fourth port and whose destination is the first destination device.

Alternatively, when the bandwidth of the first port is less than the sum of the third bandwidth and the fourth bandwidth, the first sub-bandwidth is equal to the bandwidth of the first port× the third bandwidth/(the third bandwidth+the fourth bandwidth), and the second sub-bandwidth is equal to the bandwidth of the first port× the fourth bandwidth/(the third bandwidth+the fourth bandwidth). The first destination device determines that a packet sending rate corresponding to the first sub-bandwidth is a maximum sending rate of the service flow that needs to be sent by the forwarding device by using the third port and whose destination is the first destination device, and determines that a packet sending rate corresponding to the second sub-bandwidth is a maximum sending rate of the service flow that needs to be sent by the forwarding device by using the fourth port and whose destination is the first destination device.

S805. The first destination device notifies a packet sending device of the maximum sending rate of the at least one packet flow, where the packet sending device is a device that needs to send the at least one packet flow to the first destination device by using the forwarding device.

S806. The packet sending device sends the at least one packet flow based on the maximum sending rate of the first port.

By using the foregoing various case examples in which the destination device determines the packet sending rate based on the bandwidth, for different connection forms of the data center network and different ports, a maximum rate at which the port of the forwarding device sends a service flow may be determined, for example, a sending rate of a service flow of a single destination, a sending rate of a service flow of a plurality of destinations, and different sending rates of service flows from a plurality of forwarding devices or a plurality of packet sending devices may be determined, so as to implement flow-level scheduling of a received end device. Further, the destination device determines, based on the bandwidth of the flow and the corresponding weight that are notified by the forwarding device, a maximum sending rate at which the packet sending device sends the flow. The maximum sending rate may ensure that no congestion is caused in the data center network when the packet sending device sends the flow to the forwarding device. Then, the destination device notifies the packet sending device of the maximum sending rate. The packet sending device may send the corresponding flow based on the maximum sending rate (or a rate less than the maximum sending rate) notified by the destination device, so as to avoid congestion in the data center network and eliminate congestion that may occur in the intermediate network.

According to the congestion control method described in the foregoing from a perspective of interaction among the packet sending device, the forwarding device, and the destination device, a two-level scheduling manner is used from two levels: the forwarding device and the destination device. That is, a network device of the data center network schedules the destination device, performs coarse-grained bandwidth allocation based on weights of flows destined for different destination devices, allocates each flow a bandwidth that does not cause congestion to the central network, and notifies the destination device of the bandwidth. The destination device performs fine-grained division, determines a maximum sending rate for each flow, and notifies the packet sending device of the maximum sending rate. For a case in which a plurality of paths exists, a quantity of flows at each receive end is inconsistent, and a priority distribution degree is inconsistent in the data center network, one normalized weight is implemented. The intermediate network allocates a bandwidth based on a weight of the receive end, and then the receive end determines a sending rate of a transmit end. The transmit end may send a packet flow at a rate less than or equal to the maximum sending rate, so as to avoid network congestion. This method can adapt to capabilities of different devices, so as to maintain a state of each flow, implement network scheduling at the level of the forwarding device, normalize a weight based on each flow, and allocate a proper bandwidth to each flow based on the weight, so that network congestion of the intermediate network and the last hop is completely eliminated through end-network cooperation, and the intermediate network is easy to implement and is compatible with a plurality of scheduling policies.

The foregoing describes in detail the congestion control processing method in the embodiments of this application with reference to FIG. 4 to FIG. 14. The following describes in detail congestion control processing apparatuses in the embodiments of this application with reference to FIG. 15 to FIG. 18.

Figure 15:
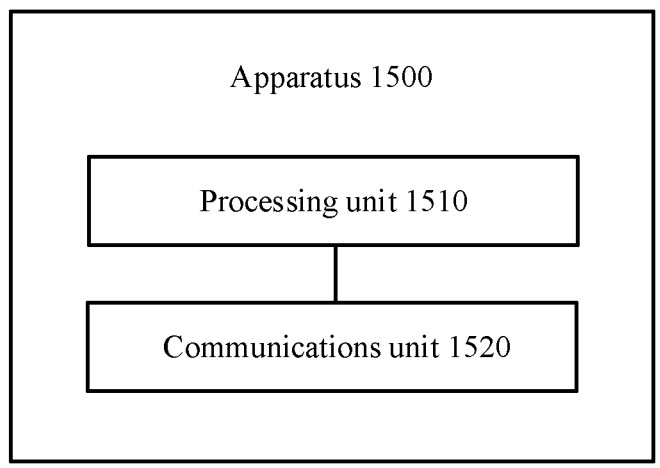
FIG. 15 is a schematic block diagram of an example congestion control processing apparatus according to an embodiment of this application.

FIG. 15 shows a schematic block diagram of a congestion control processing apparatus 1500 according to an embodiment of this application. The processing apparatus 1500 may be corresponding to the forwarding device described in the foregoing method 800, or may be a chip or a component applied to the forwarding device. In addition, each module or unit in the processing apparatus 1500 is separately configured to perform each action or processing process performed by the forwarding device in the foregoing method 800. As shown in FIG. 15, the load balancing processing apparatus 1500 may include a processing unit 1510 and a communications unit 1520.

The processing unit 1510 is configured to determine a first weight of a service flow that needs to be sent by using a first port and whose destination is a first destination device, the processing unit 1510 is further configured to allocate, based on the first weight and a bandwidth of the first port, a first bandwidth to the service flow that needs to be sent by using the first port and whose destination is the first destination device, and the communications unit 1520 is configured to notify the first destination device of the first bandwidth.

Further, the processing unit 1510 is configured to perform S801 and S802 in the method 800. The communications unit 1520 is configured to perform S803 in the method 800. A specific process in which the units perform the foregoing corresponding steps is described in detail in the method 800. For brevity, details are not described herein again.

Figure 16:
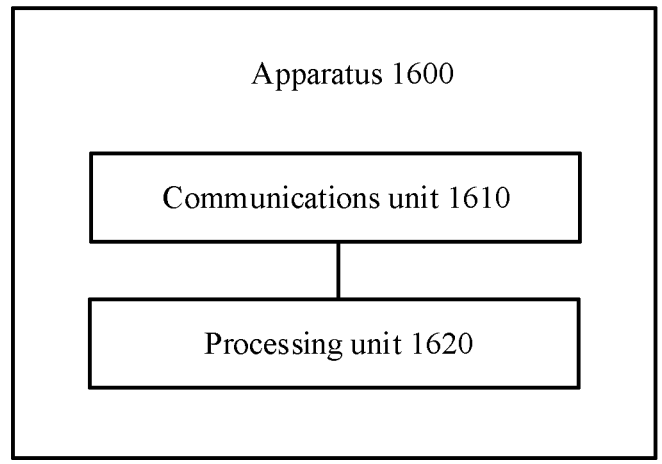
FIG. 16 is a schematic block diagram of another example congestion control processing apparatus according to an embodiment of this application.

FIG. 16 shows a schematic block diagram of a congestion control processing apparatus 1600 according to an embodiment of this application. The processing apparatus 1600 may be corresponding to the forwarding device described in the foregoing method 800, or may be a chip or a component applied to the forwarding device. In addition, each module or unit in the processing apparatus 1600 is separately configured to perform each action or processing process performed by the forwarding device in the foregoing method 800. As shown in FIG. 16, the load balancing processing apparatus 1600 may include a communications unit 1610 and a processing unit 1620.

The communications unit 1610 is configured to receive a first bandwidth notified by a first packet forwarding apparatus, where the first bandwidth is a bandwidth allocated by the first packet forwarding apparatus to a service flow that needs to be sent by using a first port and whose destination is the packet receiving apparatus, the processing unit 1620 is configured to determine, based on the first bandwidth, a maximum sending rate of at least one packet flow in the service flow that needs to be sent by using the first port and whose destination is the packet receiving apparatus, and the communications unit 1610 is further configured to notify a source device of the maximum sending rate of the at least one packet flow, where the source device is a device that needs to send the at least one packet flow to the packet receiving apparatus by using the first packet forwarding apparatus.

Further, the communications unit 1610 is configured to perform S803 and S805 in the method 800. The processing unit 1620 is configured to perform S804 in the method 800. A specific process in which the units perform the foregoing corresponding steps is described in detail in the method 800. For brevity, details are not described herein again.

Figure 17:
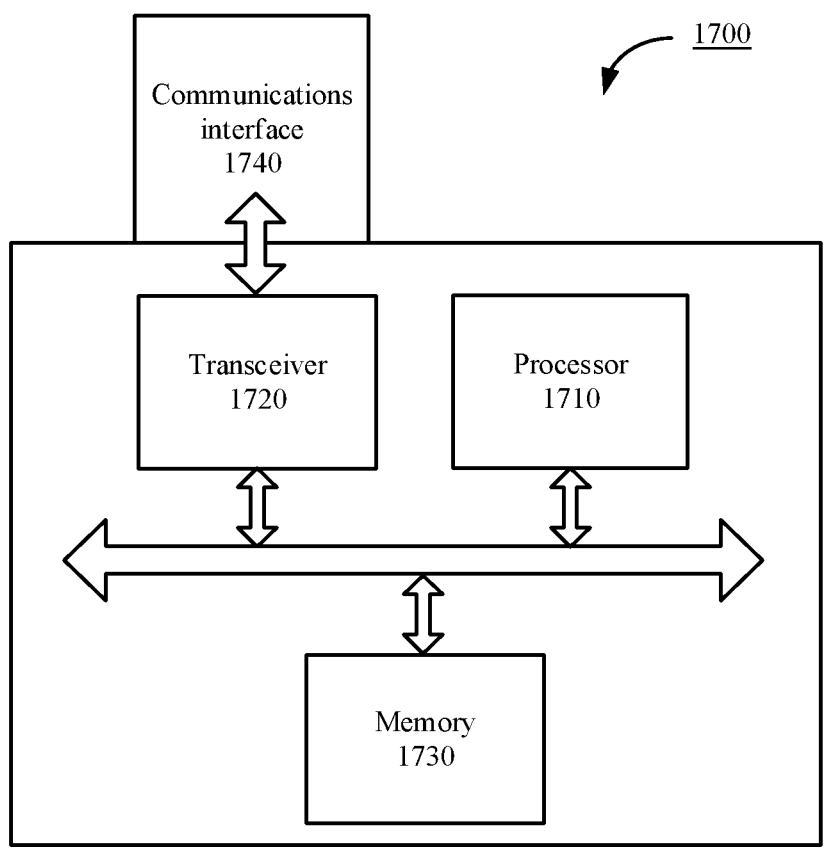
FIG. 17 is a schematic structural diagram of a forwarding device according to an embodiment of this application.

FIG. 17 is a schematic structural diagram of a forwarding device 1700 according to an embodiment of this application. As shown in FIG. 17, the forwarding device 1700 includes a processor 1710 and a transceiver 1720. Optionally, the forwarding device 1700 further includes a memory 1730. The processor 1710, the transceiver 1720, and the memory 1730 communicate with each other through an internal connection channel to transmit a control signal and/or a data signal. The memory 1730 is configured to store a computer program. The processor 1710 is configured to invoke the computer program from the memory 1730 and run the computer program to control the transceiver 1720 to receive or send a signal.

The processor 1710 and the memory 1730 may be integrated into one processing apparatus, and the processor 1710 is configured to execute program code stored in the memory 1730, to implement the function of the forwarding device in the foregoing method embodiment. In specific implementation, the memory 1730 may also be integrated into the processor 1710, or may be independent of the processor 1710. The transceiver 1720 may be implemented by using a transceiver circuit.

The forwarding device may further include a communications interface 1740 configured to send a packet output by the transceiver 1720, or send a received packet to the transceiver 1720 for further processing.

It should be understood that the processing apparatus 1700 may be corresponding to the forwarding device in the method 800 according to the embodiment of this application, or the processing apparatus 1700 may be a chip or a component applied to the forwarding device. In addition, each module in the processing apparatus 1700 implements a corresponding procedure in the method 800 in FIG. 8. Further, the memory 1730 is configured to store program code, so that when the processor 1710 executes the program code, the processor 1710 is controlled to perform S801 and S802 in the method 800. The transceiver 1720 is configured to perform S803 in the method 800. A specific process of performing the foregoing corresponding step by each unit is described in detail in the method 800. For brevity, details are not described herein again.

Figure 18:
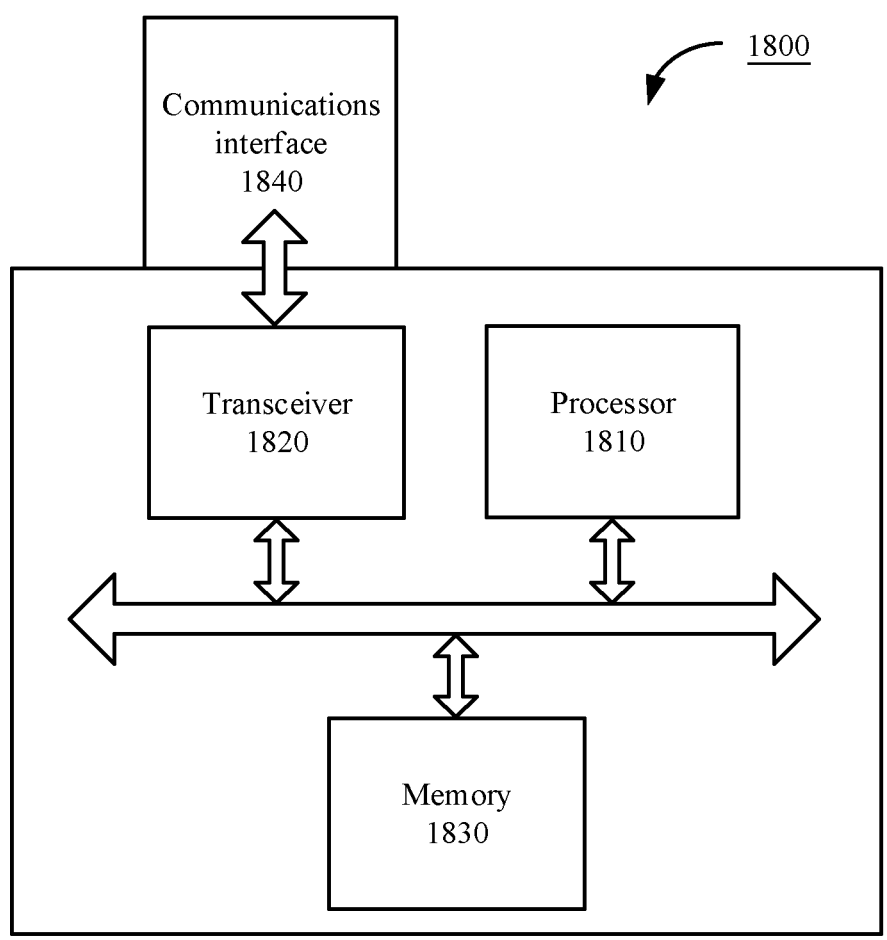
FIG. 18 is a schematic structural diagram of a packet receiving device according to an embodiment of this application.

FIG. 18 is a schematic structural diagram of a packet receiving device (destination device) 1800 according to an embodiment of this application. As shown in FIG. 18, the packet receiving device 1800 includes a processor 1810 and a transceiver 1820. Optionally, the forwarding device 1800 further includes a memory 1830. The processor 1810, the transceiver 1820, and the memory 1830 communicate with each other through an internal connection channel to transmit a control signal and/or a data signal. The memory 1830 is configured to store a computer program. The processor 1810 is configured to invoke the computer program from the memory 1830 and run the computer program to control the transceiver 1820 to receive or send a signal.

The processor 1810 and the memory 1830 may be integrated into one processing apparatus, and the processor 1810 is configured to execute program code stored in the memory 1830, to implement the function of the forwarding device in the foregoing method embodiment. In specific implementation, the memory 1830 may also be integrated into the processor 1810, or may be independent of the processor 1810. The transceiver 1820 may be implemented by using a transceiver circuit.

The forwarding device may further include a communications interface 1840 configured to send a packet output by the transceiver 1820, or send a received packet to the transceiver 1820 for further processing.

It should be understood that the processing apparatus 1800 may be corresponding to the forwarding device in the method 500 according to the embodiment of this application, or the processing apparatus 1800 may be a chip or a component applied to the forwarding device. In addition, each module in the processing apparatus 1800 implements a corresponding procedure in the method 800 in FIG. 8. Further, the memory 1830 is configured to store program code, so that when the processor 1810 executes the program code, the processor 1810 is controlled to perform S804 in the method 800. The transceiver 1820 is configured to perform S803 and S805 in the method 800. A specific process of performing the foregoing corresponding step by each unit is described in detail in the method 800. For brevity, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is one example. For example, the unit division is logical function division in one example and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a read-only memory (ROM), a random-access memory (RAM), a magnetic disk, or an optical disc.

The foregoing descriptions are example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A bandwidth allocation method comprising:
   determining a first weight of a first service flow to be sent to a first destination device using a port;
   determining a second weight of a second service flow to be sent to a second destination device using the port, wherein the second destination device is different from the first destination device;
   allocating, based on the first weight, the second weight, and a total bandwidth of the port, a first bandwidth to the first service flow, wherein the first bandwidth is equal to a first quantity divided by a second quantity, wherein the first quantity is a product of the total bandwidth and the first weight, and wherein the second quantity is a sum of the first weight and the second weight; and;
   notifying the first destination device of the first bandwidth.

2. The bandwidth allocation method of claim 1, further comprising:
   determining a plurality of weights that are in a one-to-one correspondence with a plurality of packet flows comprised in a first set, wherein the first service flow comprises the packet flows; and
   determining the first weight based on the weights, wherein the first weight is equal to a sum of the weights.

3. The bandwidth allocation method of claim 2, further comprising receiving a plurality of packets carrying the weights.

4. The bandwidth allocation method of claim 1, further comprising:
   identifying that a first forwarding device is coupled to the first destination device using a second forwarding device; and
   further notifying, in response to the identifying, the second forwarding device of the first bandwidth to enable the second forwarding device to allocate, based on the first bandwidth, a bandwidth to the first service flow.

5. The bandwidth allocation method of claim 1, further comprising identifying that a first forwarding device is coupled to the first destination device without using a second forwarding device.

6. The bandwidth allocation method of claim 5, further comprising further notifying, in response to the identifying, the first destination device of the first bandwidth.

7. The bandwidth allocation method of claim 3, wherein the packets separately belong to the packet flows.

8. The bandwidth allocation method of claim 7, wherein each of the packets carries one of the weights.

9. A first packet forwarding apparatus comprising:
   a memory configured to store instructions; and
   one or more processors coupled to the memory, wherein the instructions, when executed by the one or more processors, cause the first packet forwarding apparatus to be configured to:
      determine a first weight of a first service flow to be sent to a first destination device using a first port;
      determine a second weight of a second service flow to be sent to a second destination device using the first port, wherein the second destination device is different from the first destination device;
      allocate, based on the first weight, the second weight, and a total bandwidth of the first port, a first bandwidth to the first service flow, wherein the first bandwidth is equal to a first quantity divided by a second quantity, wherein the first quantity is a product of the total bandwidth and the first weight, and wherein the second quantity is a sum of the first weight and the second weight; and
      notify the first destination device of the first bandwidth.

10. The first packet forwarding apparatus of claim 9, wherein the instructions, when executed by the one or more processors, further cause the first packet forwarding apparatus to be configured to:
   determine a plurality of weights that are in a one-to-one correspondence with a plurality of packet flows comprised in a first set, wherein the first service flow comprises the packet flows; and
   determine the first weight based on the weights, wherein the first weight is equal to a sum of the weights.

11. The first packet forwarding apparatus of claim 10, wherein before determining the weights, the instructions, when executed by the one or more processors, further cause the first packet forwarding apparatus to be configured to receive a plurality of packets carrying the weights, wherein the packets separately belong to the packet flows, and wherein each of the packets carries one of the weights.

12. The first packet forwarding apparatus of claim 9, wherein the instructions, when executed by the one or more processors, further cause the first packet forwarding apparatus to be configured to:
   identify that the first packet forwarding apparatus is coupled to the first destination device using a second packet forwarding apparatus; and
   notify the second packet forwarding apparatus of the first bandwidth to enable the second packet forwarding apparatus to allocate, based on the first bandwidth, a bandwidth to the first service flow.

13. The first packet forwarding apparatus of claim 9, wherein:
   the first service flow comprises a third service flow to be received from a third packet forwarding apparatus using a second port to a first destination address and a fourth service flow to be received from a fourth packet forwarding apparatus using a third port to the first destination address;
   the third packet forwarding apparatus is coupled to the first packet forwarding apparatus using the second port;
   a bandwidth allocated by the third packet forwarding apparatus to the third service flow is a second bandwidth;
   the fourth packet forwarding apparatus is coupled to the first packet forwarding apparatus using the third port;
   a bandwidth allocated by the fourth packet forwarding apparatus to the fourth service flow is a third bandwidth;
   the first bandwidth comprises a first sub-bandwidth and a second sub-bandwidth; and
   when the total bandwidth is greater than or equal to a sum of the second bandwidth and the third bandwidth, the instructions, when executed by the one or more processors, further cause the one or more processors to be configured to:
      determine that the first sub-bandwidth is equal to the second bandwidth;
      determine that the second sub-bandwidth is equal to the third bandwidth;

send, to the first destination device using the first sub-bandwidth, the third service flow; and send, to the first destination device using the second sub-bandwidth, the fourth service flow.

14. A computer program product comprising instructions stored on a non-transitory computer-readable medium that, when executed by one or more processors, cause a first forwarding device to:

determine a first weight of a first service flow to be sent to a first destination device using a port;

determine a second weight of a second service flow to be sent to a second destination device using the port, wherein the second destination device is different from the first destination device;

allocate, based on the first weight, the second weight, and a total bandwidth of the port, a first bandwidth to the first service flow, wherein the first bandwidth is equal to a first quantity divided by a second quantity, wherein the first quantity is a product of the total bandwidth and the first weight, and wherein the second quantity is a sum of the first weight and the second weight; and notify the first destination device of the first bandwidth.

15. The computer program product of claim 14, wherein the one or more processors are further configured to execute the instructions to:

determine a plurality of weights that are in a one-to-one correspondence with a plurality of packet flows comprised in a first set, wherein the first service flow comprises the packet flows; and determine the first weight based on the weights, wherein the first weight is equal to a sum of the weights.

16. The computer program product of claim 15, wherein the one or more processors are further configured to execute the instructions to receive a plurality of packets carrying the weights.

17. The computer program product of claim 16, wherein the packets separately belong to the packet flows.

18. The computer program product of claim 14, wherein the one or more processors are further configured to execute the instructions to:

identify that the first forwarding device is coupled to the first destination device using a second forwarding device; and further notify, in response to the identifying, the second forwarding device of the first bandwidth to enable the second forwarding device to allocate, based on the first bandwidth, a bandwidth to the first service flow.

19. The computer program product of claim 14, wherein the one or more processors are further configured to execute the instructions to identify that the first forwarding device is coupled to the first destination device without using a second forwarding device.

20. The computer program product of claim 19, wherein the one or more processors are further configured to execute the instructions to notify, in response to the identifying, the first destination device of the first bandwidth.

* * * * *